United States Patent
Son et al.

(10) Patent No.: US 11,716,125 B2
(45) Date of Patent: Aug. 1, 2023

(54) WIRELESS COMMUNICATION METHOD AND WIRELESS COMMUNICATION TERMINAL FOR SIGNALING MULTI-USER PACKET

(71) Applicants: WILUS INSTITUTE OF STANDARDS AND TECHNOLOGY INC., Gyeonggi-do (KR); SK TELECOM CO., LTD., Seoul (KR)

(72) Inventors: Juhyung Son, Gyeonggi-do (KR); Jinsam Kwak, Gyeonggi-do (KR); Geonjung Ko, Gyeonggi-do (KR); Woojin Ahn, Gyeonggi-do (KR)

(73) Assignees: WILUS INSTITUTE OF STANDARDS AND TECHNOLOGY INC., Gyeonggi-do (KR); SK TELECOM CO., LTD., Seoul (KR)

( * ) Notice: Subject to any disclaimer, the term of this patent is extended or adjusted under 35 U.S.C. 154(b) by 0 days.

(21) Appl. No.: 17/494,831

(22) Filed: Oct. 6, 2021

(65) Prior Publication Data
US 2022/0029669 A1    Jan. 27, 2022

Related U.S. Application Data

(63) Continuation of application No. 16/798,197, filed on Feb. 21, 2020, now Pat. No. 11,171,695, which is a
(Continued)

(30) Foreign Application Priority Data

Jan. 9, 2017   (KR) .................. 10-2017-0003147
Jan. 18, 2017  (KR) .................. 10-2017-0008927

(51) Int. Cl.
*H04L 5/12*    (2006.01)
*H04B 7/0452*  (2017.01)
(Continued)

(52) U.S. Cl.
CPC .......... *H04B 7/0452* (2013.01); *H04B 7/028* (2013.01); *H04L 5/0023* (2013.01);
(Continued)

(58) Field of Classification Search
CPC ..... H04B 7/0452; H04B 7/028; H04L 5/0023; H04L 5/0048; H04L 27/2603;
(Continued)

(56) References Cited

U.S. PATENT DOCUMENTS 8,625,562 B2 * 1/2014 Noh .................... H04W 72/085
                                                        370/465
9,641,234 B2   5/2017 Moon et al.
(Continued)

FOREIGN PATENT DOCUMENTS

EP    3 139 532    3/2017
EP    3 226 641    10/2017
(Continued)

OTHER PUBLICATIONS

International Search Report for PCT/KR2018/000443 dated May 4, 2018 and its English translation from WIPO (now published as WO 2018/128530).
(Continued)

*Primary Examiner* — Helene E Tayong
(74) *Attorney, Agent, or Firm* — Ladas & Parry, LLP

(57) ABSTRACT

The present invention relates to a wireless communication method and a wireless communication terminal for signaling a multi-user packet. More specifically, provided are a wireless communication terminal including a communication unit; and a processor configured to process signals transmitted and received through the communication unit,
(Continued)

wherein the processor receives, through the communication unit, a high efficiency multi-user PHY protocol data unit (HE MU PPDU), wherein a preamble of the HE MU PPDU includes high efficiency signal A field (HE-SIG-A) and high efficiency signal B field (HE-SIG-B), and decodes the received HE MU PPDU based on information obtained from the HE-SIG-A, wherein a configuration of the HE-SIG-B is identified based on information obtained from at least one subfield of the HE-SIG-A and a wireless communication method using the same.

10 Claims, 12 Drawing Sheets

Related U.S. Application Data continuation of application No. 16/731,031, filed on Dec. 31, 2019, now Pat. No. 11,159,210, which is a continuation of application No. 16/505,664, filed on Jul. 8, 2019, now Pat. No. 10,567,047, which is a continuation of application No. PCT/KR2018/000443, filed on Jan. 9, 2018.

(51) Int. Cl.
*H04B 7/02* (2018.01)
*H04L 5/00* (2006.01)
*H04L 27/26* (2006.01)

(52) U.S. Cl.
CPC ........ *H04L 5/0048* (2013.01); *H04L 27/2602* (2013.01); *H04L 27/2603* (2021.01)

(58) Field of Classification Search
CPC .............. H04L 27/2602; H04W 28/06; H04W 72/042; H04W 74/08; H04W 84/12
USPC ........................................................ 375/262
See application file for complete search history.

(56) References Cited

U.S. PATENT DOCUMENTS

| | | | |
|---|---|---|---|
| 10,219,271 | B1 | 2/2019 | Hedayat et al. |
| 10,574,418 | B2 * | 2/2020 | Chu .................... H04W 72/085 |
| 10,966,200 | B2 * | 3/2021 | Chu ...................... H04W 28/20 |
| 2015/0334708 | A1 | 11/2015 | Lee et al. |
| 2015/0349995 | A1 | 12/2015 | Zhang et al. |
| 2016/0156438 | A1 | 6/2016 | Sun et al. |
| 2016/0315681 | A1 | 10/2016 | Moon et al. |
| 2016/0330300 | A1 | 11/2016 | Josiam et al. |
| 2016/0366666 | A1 | 12/2016 | Yang et al. |
| 2017/0006608 | A1 | 1/2017 | Josiam et al. |
| 2017/0048844 | A1 | 2/2017 | Chen et al. |
| 2017/0126456 | A1 | 5/2017 | Lee et al. |
| 2017/0230155 | A1 | 8/2017 | Lee et al. |
| 2019/0334590 | A1 | 10/2019 | Son et al. |
| 2020/0195314 | A1 | 6/2020 | Son et al. |
| 2020/0204223 | A1 | 6/2020 | Son et al. |

FOREIGN PATENT DOCUMENTS

| | | | |
|---|---|---|---|
| KR | 10-2016-0063282 | | 6/2016 |
| KR | 20160081832 | * | 7/2016 |
| KR | 10-2016-0130944 | | 11/2016 |
| WO | 2016/087917 | | 6/2016 |
| WO | 2016/088956 | | 6/2016 |
| WO | 2016/175435 | | 11/2016 |
| WO | 2016/178795 | | 11/2016 |
| WO | 2016/182412 | | 11/2016 |
| WO | 2016/208330 | | 12/2016 |
| WO | 2016/208830 | | 12/2016 |
| WO | 2017/003193 | | 1/2017 |
| WO | 2018/128530 | | 7/2018 |

OTHER PUBLICATIONS

Written Opinion of the International Searching Authority for PCT/KR2018/000443 dated May 4, 2018 and its English translation by Google Translate (now published as WO 2018/128530).
International Preliminary Report on Patentability (Chapter I) for PCT/KR2018/000443 dated Jul. 9, 2019 and its English translation from WIPO (now published as WO 2018/128530).
Robert Stacey, "Comments on TGax/D1.O", IEEE P802.11 Wireless LANs; doc.: IEEE 802.11-17/0010r0, Jan. 9, 2017. pp. 1-249.
John Son et al., WILUS: "Discussions on Signaling for UL HE MU PPDU", doc.: IEEE P802.11-17/0110r0; Jan. 16, 2017. Slides 1-9.
John Son et al., WILUS: "CIDs on Signaling for UL HE MU PPDU", IEEE P802.11 Wireless LANs; doc.: IEEE 802.11-17/0173r0, Jan. 19, 2017. pp. 1-3.
Notice of Allowance dated Oct. 2, 2019 for U.S. Appl. No. 16/505,664 (now published as US 2019/0334590).
Office Action dated Aug. 30, 2019 for U.S. Appl. No. 16/505,664 (now published as US 2019/0334590).
Notice of Allowance dated Apr. 20, 2021 for U.S. Appl. No. 16/731,031 (now published as US 2020/0204223).
Notice of Allowance dated Jun. 25, 2021 for U.S. Appl. No. 16/731,031 (now published as US 2020/0204223).
Corrected Notice of Allowance dated Aug. 9, 2021 for U.S. Appl. No. 16/731,031 (now published as US 2020/0204223).
Corrected Notice of Allowance dated Sep. 17, 2021 for U.S. Appl. No. 16/731,031 (now published as US 2020/0204223).
Final Office Action dated Jan. 1, 2021 for U.S. Appl. No. 16/731,031 (now published as US 2020/0204223).
Office Action dated Jun. 25, 2020 for U.S. Appl. No. 16/731,031 (now published as US 2020/0204223).
Corrected Notice of Allowance dated Sep. 9, 2021 for U.S. Appl. No. 16/798,197 (now published as US 2020/0195314).
Corrected Notice of Allowance dated Aug. 9, 2021 for U.S. Appl. No. 16/798,197 (now published as US 2020/0195314).
Notice of Allowance dated Jul. 2, 2021 for U.S. Appl. No. 16/798,197 (now published as US 2020/0195314).
Notice of Allowance dated May 7, 2021 for U.S. Appl. No. 16/798,197 (now published as US 2020/0195314).
Final Office Action dated Jan. 6, 2021 for U.S. Appl. No. 16/798,197 (now published as US 2020/0195314).
Office Action dated Jun. 25, 2020 for U.S. Appl. No. 16/798,197 (now published as US 2020/0195314).
Extended European Search Report dated Jul. 31, 2020 for European Patent Application No. 18736375.9.
IEEE 802.11ax/D0.5, "High Efficiency (HE) PHY specification". Sep. 2016, XP068137445.
Office Action dated Aug. 12, 2020 for Chinese Patent Application No. 201880005845.6 and its English translation provided by Applicant's foreign counsel.
Office Action dated Aug. 31, 2020 for Japanese Patent Application No. 2019-537309 and its English translation from Global Dossier.
Stacey et al., IEEE 802.11-16/0024r1, "Proposed TGax Draft Specification", Mar. 2, 2016.
Oteri et al., IEEE 802.11-16/0866r4, "Comment Resolutions on Clause 26.3.13", Jul. 24, 2016.
Stacey et al., IEEE 802.11-15/0132r17, "Specification Framework for TGax", May 25, 2016.
Office Action dated Nov. 2, 2020 for Korean Patent Application No. 10-2020-7005005 and its English translation provided by Applicant's foreign counsel.
Notice of Allowance dated Feb. 25, 2021 for Korean Patent Application No. 10-2020-7005005 and its English translation provided by Applicant's foreign counsel.
Office Action dated Mar. 22, 2021 for Japanese Patent Application No. 2019-537309 and its English translation provided by Applicant's foreign counsel.
Office Action dated May 1, 2021 for European Patent Application No. 18 736 375.9.
Office Action dated Jul. 8, 2021 for Korean Patent Application No. 10-2021-7015929 and its English translation provided by Applicant's foreign counsel.

(56) References Cited

OTHER PUBLICATIONS

Office Action dated Jul. 16, 2022 for Korean Patent Application No. 10-2022-7017351 and its English translation provided by the Applicant's foreign counsel.
Notice of Allowance dated Jul. 4, 2022 for European Patent Application No. 18736375.9.
Office Action dated Jan. 23, 2023 for Japanese Patent Application No. 2022-003270 and its English translation provided by the Applicant's foreign counsel.
Kaushik Josiam (Samsung): "HE-SIG-B Compression Mode", IEEE 802.11-15/0349rl, Mar. 14, 2016, slides 1-17.
Office Action dated Jan. 23, 2023 for Japanese Patent Application No. 2022-003271 and its English translation provided by the Applicant's foreign counsel.
Extended European Search Report dated Feb. 9, 2023 for European Patent Application No. 22214745.6.
Office Action dated May 25, 2023 for Korean Patent Application No. 10-2022-7017351 and its English translation provided by the Applicant's foreign counsel.

\* cited by examiner

| L-STF | L-LTF | L-SIG | RL-SIG | HE-SIG-A | HE-SIG-B | HE-STF | HE-LTF | ... | SVC | A-MPDU | TAIL |

(a)

| Field | Bit | Descriptions |
|---|---|---|
| Format | 1 | 0: Trigger-based PPDU, 1: SU PPDU |
| Beam Change | 1 | |
| UL/DL | 1 | 0:DL, 1:UL |
| MCS | 4 | |
| DCM | 1 | Dual carrier modulation |
| BSS Color | 6 | BSS identification info |
| Reserved | 1 | |
| Spatial Reuse | 4 | TBD |
| Bandwidth | 2 | 20/40/80/160(80+80)MHz |
| GI+LTF Size | 3 | 1x_LTF+0.8us_GI; 2x_LTF+0.8us_GI; 2x_LTF+1.6us_GI; 4x_LTF+3.2us_GI |
| NSTS | 3 | 1~8 space time streams |
| TXOP Duration | 7 | |
| Coding | 1 | 0:BCC, 1:LDPC |
| LDPC Extra Sym. | 1 | |
| STBC | 1 | Space Time Block Coding |
| TxBF | 1 | Beamforming |
| Pre-FEC Padding | 2 | Padding Length |
| Padding Disam. | 1 | Padding Disambiguity |
| Reserved | 1 | |
| Doppler | 1 | |
| CRC | 4 | |
| Tail | 6 | |

(b)

| Field | Bit | Descriptions |
|---|---|---|
| UL/DL | 1 | 0:DL, 1:UL |
| SIGB MCS | 3 | MCS0~MCS5 |
| SIGB DCM | 1 | Dual carrier modulation |
| BSS Color | 6 | BSS identification info |
| Spatial Reuse | 4 | TBD |
| Bandwidth | 3 | (DL) 20/40/80/160(80+80), 80A, 80B, 160A, 160B; (UL) 20/40/80/160(80+80), left-106t one, right-106tone, reserved |
| Num of SIG-B Sym | 4 | if SIG-B Compression is 1 (DL) Num of MU-MIMO Users; (UL) Num of SIG-B Sym |
| SIG-B Compression | 1 | (DL) Set to 1 in Full BW MU-MIMO (UL) Always set to 1 to remove RU Allocation subfield |
| GI+LTF Size | 3 | 2x_LTF+0.8us_GI; 2x_LTF+1.6us_GI; 4x_LTF+3.2us_GI |
| Doppler | 1 | |
| TXOP Duration | 7 | |
| Reserved | 1 | |
| Num of HE-LTF Sym | 3 | 1, 2, 4, 6, 8 |
| LDPC Extra Sym. | 1 | |
| STBC | 1 | Space Time Block Coding |
| Pre-FEC Padding | 2 | Padding Length |
| Padding Disam. | 1 | Padding Disambiguity |
| CRC | 4 | |
| Tail | 6 | |

(c)

| Field | Bit | Descriptions |
|---|---|---|
| Format | 1 | 0: Trigger-based PPDU, 1: SU PPDU |
| BSS Color | 6 | BSS identification info |
| Spatial Reuse1 | 4 | Spatial Reuse Parameter |
| Spatial Reuse2 | 4 | Spatial Reuse Parameter |
| Spatial Reuse3 | 4 | Spatial Reuse Parameter |
| Spatial Reuse4 | 4 | Spatial Reuse Parameter |
| Reserved | 1 | |
| Bandwidth | 2 | 20/40/80/160(80+80)MHz |
| TXOP Duration | 7 | |
| Reserved | 9 | |
| CRC | 4 | |
| Tail | 6 | |

FIG. 12

| L-STF | L-LTF | L-SIG | RL-SIG | HE-SIG-A | HE-SIG-B | HE-STF | HE-LTF | ... | A-MPDU |

(a)

| Field | Bit | Descriptions |
|---|---|---|
| Format | 1 | 0: Trigger-based PPDU, 1: SU PPDU |
| Beam Change | 1 | |
| UL/DL | 1 | 0:DL, 1:UL |
| MCS | 4 | |
| DCM | 1 | Dual carrier modulation |
| BSS Color | 6 | BSS identification info |
| Reserved | 1 | |
| Spatial Reuse | 4 | TBD |
| Bandwidth | 2 | 20/40/80/160(80+80)MHz |
| GI+LTF Size | 3 | 1x_LTF+0.8us_GI<br>2x_LTF+0.8us_GI<br>2x_LTF+1.6us_GI<br>4x_LTF+3.2us_GI |
| NSTS | 3 | 1~8 space time streams |
| TXOP Duration | 7 | |
| Coding | 1 | 0:BCC, 1:LDPC |
| LDPC Extra Sym. | 1 | |
| STBC | 1 | Space Time Block Coding |
| TxBF | 1 | Beamforming |
| Pre-FEC Padding | 2 | Padding Length |
| Padding Disam. | 1 | Padding Disambiguity |
| Reserved | 1 | |
| Doppler | 1 | |
| CRC | 4 | |
| Tail | 6 | |

(b)

| Field | Bit | Descriptions |
|---|---|---|
| UL/DL | 1 | 0:DL, 1:UL |
| SIGB MCS | 3 | MCS0~MCS5 |
| SIGB DCM | 1 | Dual carrier modulation |
| BSS Color | 6 | BSS identification info |
| Spatial Reuse | 4 | TBD |
| Bandwidth | 3 | (DL) 20/40/80/160(80+80), 80A, 80B, 160A, 160B<br>(UL) 20/40/80/160(80+80), left-106t one, right-106tone, reserved |
| Num of SIG-B Sym | 4 | if SIG-B Compression is 1<br>(DL) Num of MU-MIMO Users<br>(UL) Num of SIG-B Sym |
| SIG-B Compression | 1 | (DL) Set to 1 in Full BW MU-MIMO<br>(UL) Always set to 1 to remove RU Allocation subfield |
| GI+LTF Size | 3 | 2x_LTF+0.8us_GI<br>2x_LTF+1.6us_GI<br>4x_LTF+3.2us_GI |
| Doppler | 1 | |
| TXOP Duration | 7 | |
| Reserved | 1 | |
| Num of HE-LTF Sym | 3 | 1, 2, 4, 6, 8 |
| LDPC Extra Sym. | 1 | |
| STBC | 1 | Space Time Block Coding |
| Pre-FEC Padding | 2 | Padding Length |
| Padding Disam. | 1 | Padding Disambiguity |
| CRC | 4 | |
| Tail | 6 | |

(c)

| Field | Bit | Descriptions |
|---|---|---|
| Format | 1 | 0: Trigger-based PPDU, 1: SU PPDU |
| BSS Color | 6 | BSS identification info |
| Spatial Reuse1 | 4 | Spatial Reuse Parameter |
| Spatial Reuse2 | 4 | Spatial Reuse Parameter |
| Spatial Reuse3 | 4 | Spatial Reuse Parameter |
| Spatial Reuse4 | 4 | Spatial Reuse Parameter |
| Reserved | 1 | |
| Bandwidth | 2 | 20/40/80/160(80+80)MHz |
| TXOP Duration | 7 | |
| Reserved | 9 | |
| CRC | 4 | |
| Tail | 6 | |

FIG. 13

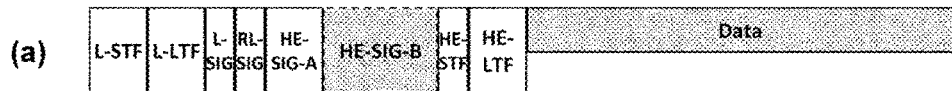
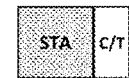
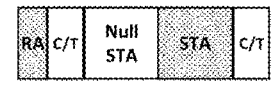
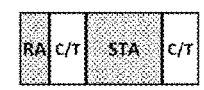
FIG. 14
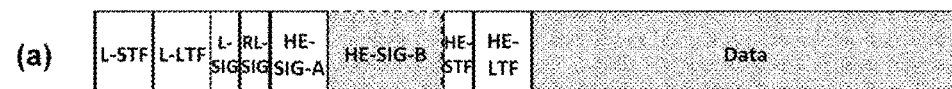
FIG. 15

WIRELESS COMMUNICATION METHOD AND WIRELESS COMMUNICATION TERMINAL FOR SIGNALING MULTI-USER PACKET

CROSS-REFERENCE TO RELATED APPLICATIONS

This application is a continuation of U.S. patent application Ser. No. 16/798,197 filed on Feb. 21, 2020, which is a continuation of U.S. patent application Ser. No. 16/731,031 filed on Dec. 31, 2019, which is a continuation of U.S. patent application Ser. No. 16/505,664 filed on Jul. 8, 2019, issued as U.S. Pat. No. 10,567,047 on Feb. 18, 2020, which is a continuation of International Patent Application No. PCT/KR2018/000443 filed on Jan. 9, 2018, which claims the priority to Korean Patent Application No. 10-2017-0003147 filed in the Korean Intellectual Property Office on Jan. 9, 2017 and Korean Patent Application No. 10-2017-0008927 filed in the Korean Intellectual Property Office on Jan. 18, 2017, the entire contents of which are incorporated herein by reference.

TECHNICAL FIELD

The present invention relates to a wireless communication method and a wireless communication terminal for signaling a multi-user packet.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

Technical Solution

In order to achieve the objects, the present invention provides a wireless communication method and a wireless communication terminal as below.

First, an exemplary embodiment of the present invention provides a wireless communication terminal, the terminal including a communication unit; and a processor configured to process signals transmitted and received through the communication unit, wherein the processor receives, through the communication unit, a high efficiency multi-user PHY protocol data unit (HE MU PPDU), wherein a preamble of the HE MU PPDU includes high efficiency signal A field (HE-SIG-A) and high efficiency signal B field (HE-SIG-B), and decodes the received HE MU PPDU based on information obtained from the HE-SIG-A, wherein a configuration of the HE-SIG-B is identified based on information obtained from at least one subfield of the HE-SIG-A.

In addition, an exemplary embodiment of the present invention provides a wireless communication method of a wireless communication terminal, the method including: receiving a high efficiency multi-user PHY protocol data unit (HE MU PPDU), wherein a preamble of the HE MU PPDU includes high efficiency signal A field (HE-SIG-A) and high efficiency signal B field (HE-SIG-B); and decoding the received HE MU PPDU based on information obtained from the HE-SIG-A, wherein a configuration of the HE-SIG-B is identified based on information obtained from at least one subfield of the HE-SIG-A.

When a SIG-B compression field of the HE-SIG-A indicates full bandwidth MU-MIMO transmission so that a common field is not present in the HE-SIG-B, a configuration of a user specific field of the HE-SIG-B may be identified based on information obtained from at least one subfield of the HE-SIG-A.

When the SIG-B compression field of the HE-SIG-A indicates full bandwidth MU-MIMO transmission, the configuration of the user specific field of the HE-SIG-B may be identified based on information on the number of MU-MIMO users indicated by the HE-SIG-A.

A type of a user field constituting the user specific field of the HE-SIG-B may include a user field for MU-MIMO allocation and a user field for non-MU-MIMO allocation. The user specific field of the HE-SIG-B may include user fields for MU-MIMO allocation when the information on the number of MU-MIMO users indicates two or more users. The user specific field of the HE-SIG-B may include one user field for non-MU-MIMO allocation when the information on the number of MU-MIMO users indicates a single user.

The user field for MU-MIMO allocation may include a spatial configuration field indicating the total number of spatial streams in an MU-MIMO allocation and the number of spatial streams for each terminal in the MU-MIMO allocation, and the user field for non-MU-MIMO allocation may include a number of space time streams (NSTS) field.

The user field for non-MU-MIMO allocation may be a user field based on orthogonal frequency division multiple access (OFDMA) allocation.

When the SIG-B compression field of the HE-SIG-A indicates full bandwidth MU-MIMO transmission, the information on the number of MU-MIMO users may be indicated by a number of HE-SIG-B symbols field in the HE-SIG-A.

The HE-SIG-A may include a UL/DL field indicating whether the PPDU is transmitted on an uplink or transmitted on a downlink. At least one subfield of the HE-SIG-A of the PPDU may indicate different information or may be set differently based on a value indicated by the UL/DL field.

A specific value of a bandwidth field of the HE-SIG-A may indicate a predetermined non-contiguous band when the UL/DL field indicates a downlink transmission. The specific value of the bandwidth field of the HE-SIG-A may indicate a predetermined narrow band when the UL/DL field indicates an uplink transmission.

The predetermined narrow band may include at least one of a left-106-tone and a right-106-tone.

A SIG-B compression field of the HE-SIG-A may indicate whether to perform a full bandwidth MU-MIMO transmission in which a common field is not present in an HE-SIG-B field when the UL/DL field indicates a downlink transmission. The SIG-B compression field of the HE-SIG-A may always indicate that the common field is not present in the HE-SIG-B field when the UL/DL field indicates an uplink transmission.

When a SIG-B compression field of the HE-SIG-A indicates a compression mode of an HE-SIG-B field, a number of HE-SIG-B symbols field in the HE-SIG-A may indicate information on the number of MU-MIMO users if the UL/DL field indicates a downlink transmission, and the number of HE-SIG-B symbols field in the HE-SIG-A may indicate information on the number of OFDM symbols in the HE-SIG-B field.

Advantageous Effects

According to an embodiment of the present invention, a header field of a physical layer of a wireless LAN packet supporting simultaneous multi-user transmission in an indoor/outdoor environment can be efficiently configured.

According to an embodiment of the present invention, it is possible to increase the total resource utilization rate in the contention-based channel access system and improve the performance of the wireless LAN system.

DESCRIPTION OF DRAWINGS

FIG. 12 illustrates an embodiment of a configuration of an HE-SIG-A field according to the HE PPDU format.

FIG. 13 illustrates a configuration of an HE-SIG-B field according to an embodiment of the present invention.

FIGS. 14 to 15 illustrate specific embodiments in which a single STA transmits an UL MU PPDU to an AP.

DETAILED DESCRIPTION OF THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2017-0003147 and 10-2017-0008927 filed in the Korean Intellectual Property Office and the embodiments and mentioned items described in the respective application, which forms the basis of the priority, shall be included in the Detailed Description of the present application.

Figure 1:
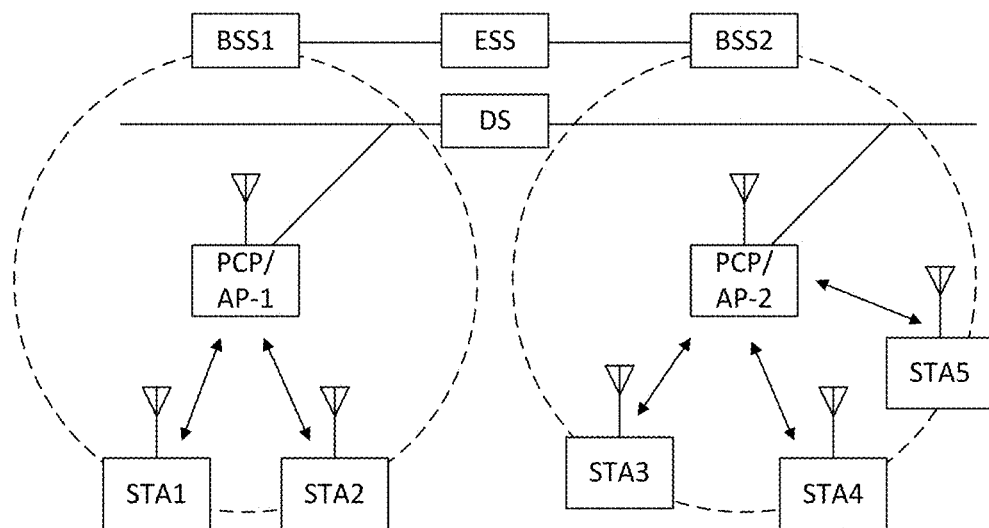
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
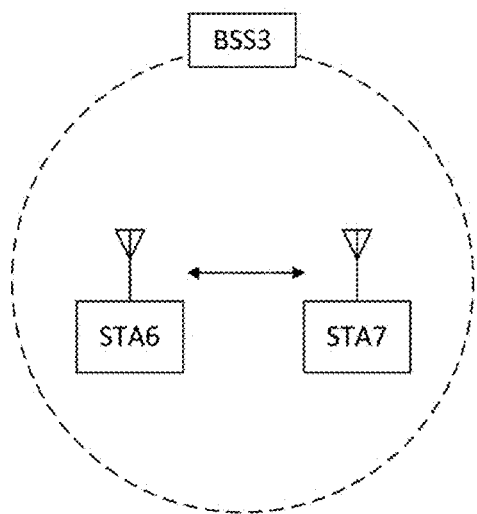
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
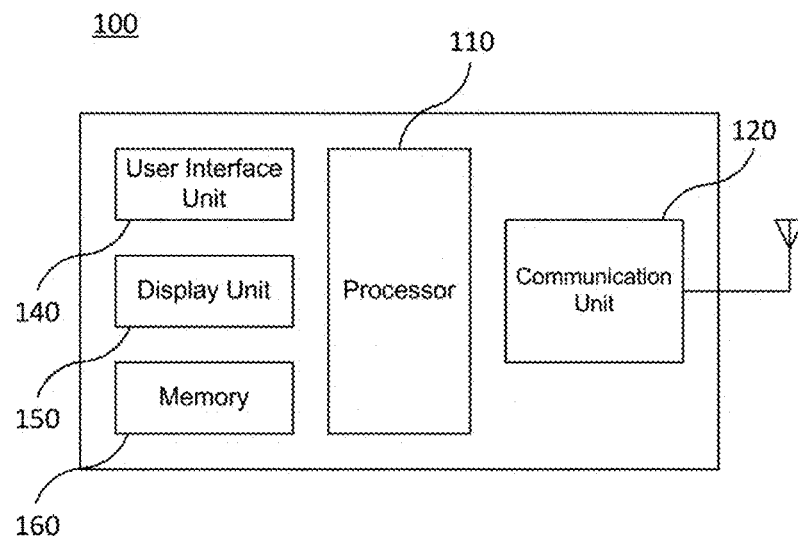
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, and 60 GHz. According to an embodiment, the station 100 may include a communication module using a frequency band of 6 GHz or more and a communication module using a frequency band of 6 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
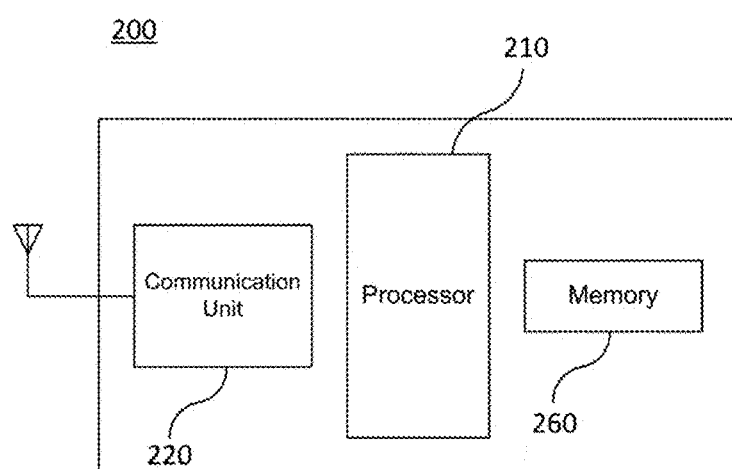
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, and 60 GHz together. Preferably, the AP 200 may include a communication module using a frequency band of 6 GHz or more and a communication module using a frequency band of 6 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
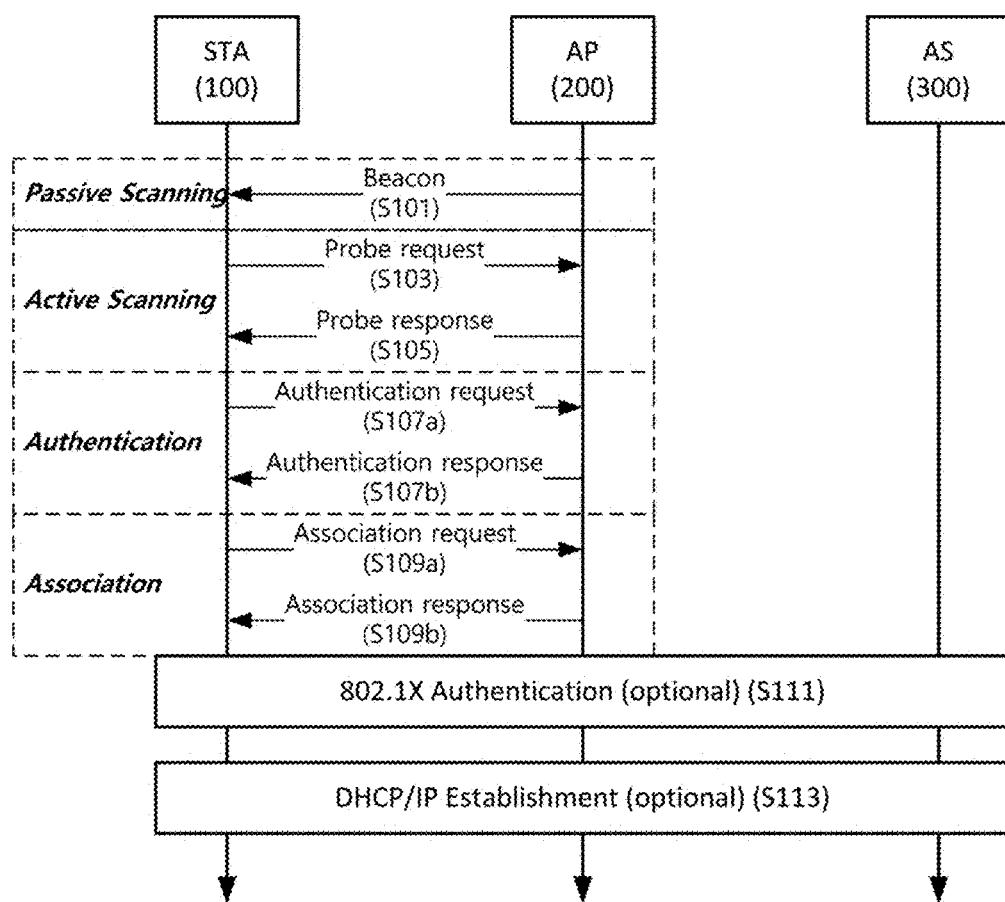
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
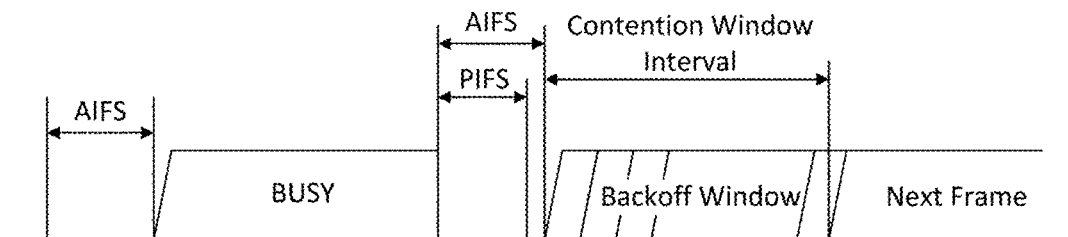
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
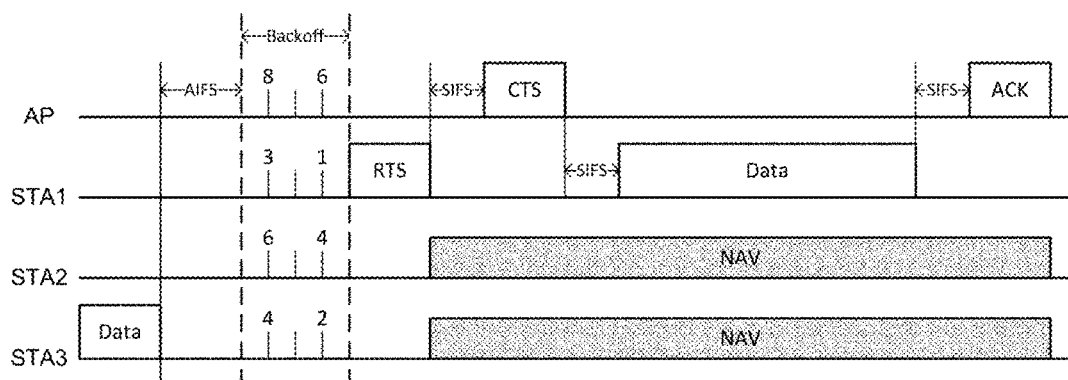
FIG. 7 illustrates a method for performing a distributed coordination function (DCF) using a request to send (RTS) frame and a clear to send (CTS) frame.

FIG. 7 is a diagram illustrating a method for performing a distributed coordination function using a request to send (RTS) frame and a clear to send (CTS) frame.

The AP and STAs in the BSS contend in order to obtain an authority for transmitting data. When data transmission at the previous step is completed, each terminal having data to be transmitted performs a backoff procedure while decreasing a backoff counter (alternatively, a backoff timer) of a random number assigned to each terminal after an AFIS time. A transmitting terminal in which the backoff counter expires transmits the request to send (RTS) frame to notify that corresponding terminal has data to transmit. According to an exemplary embodiment of FIG. 7, STA1 which holds a lead in contention with minimum backoff may transmit the RTS frame after the backoff counter expires. The RTS frame includes information on a receiver address, a transmitter address, and duration. A receiving terminal (i.e., the AP in FIG. 7) that receives the RTS frame transmits the clear to send (CTS) frame after waiting for a short IFS (SIFS) time to notify that the data transmission is available to the transmitting terminal STA1. The CTS frame includes the information on a receiver address and duration. In this case, the receiver address of the CTS frame may be set identically to a transmitter address of the RTS frame corresponding thereto, that is, an address of the transmitting terminal STA1.

The transmitting terminal STA1 that receives the CTS frame transmits the data after a SIFS time. When the data transmission is completed, the receiving terminal AP transmits an acknowledgment (ACK) frame after a SIFS time to notify that the data transmission is completed. When the transmitting terminal receives the ACK frame within a predetermined time, the transmitting terminal regards that the data transmission is successful. However, when the transmitting terminal does not receive the ACK frame within the predetermined time, the transmitting terminal regards that the data transmission is failed. Meanwhile, adjacent terminals that receive at least one of the RTS frame and the CTS frame in the course of the transmission procedure set a network allocation vector (NAV) and do not perform data transmission until the set NAV is terminated. In this case, the NAV of each terminal may be set based on a duration field of the received RTS frame or CTS frame.

In the course of the aforementioned data transmission procedure, when the RTS frame or CTS frame of the terminals is not normally transferred to a target terminal (i.e., a terminal of the receiver address) due to a situation such as interference or a collision, a subsequent process is suspended. The transmitting terminal STA1 that transmitted the RTS frame regards that the data transmission is unavailable and participates in a next contention by being assigned with a new random number. In this case, the newly assigned random number may be determined within a range (2*CW) twice larger than a previous predetermined random number range (a contention window, CW).

Basic Sequence of UL-MU/DL-MU Transmission

Figure 8:
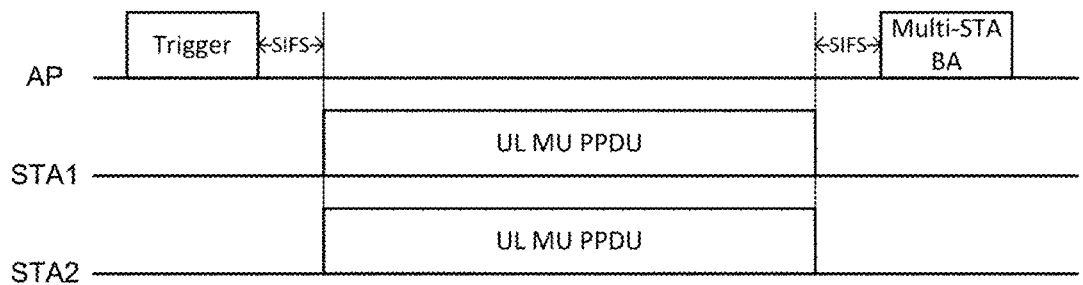
FIGS. 8 and 9 illustrate multi-user transmission methods according to an embodiment of the present invention.
Figure 9:
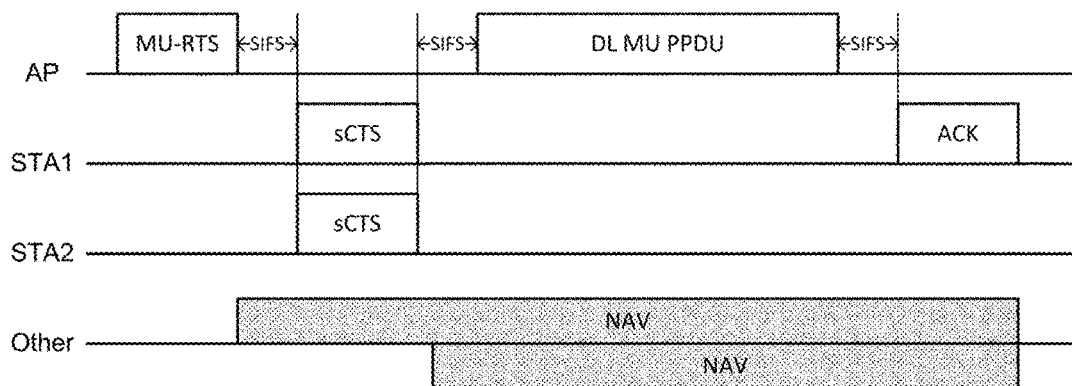

FIGS. 8 and 9 illustrate multi-user transmission methods according to an embodiment of the present invention. When using orthogonal frequency division multiple access (OFDMA) or multi-input multi-output (MIMO), one wireless communication terminal can simultaneously transmit data to a plurality of wireless communication terminals. Further, one wireless communication terminal can simultaneously receive data from a plurality of wireless communication terminals. For example, a downlink multi-user (DL-MU) transmission in which an AP simultaneously transmits data to a plurality of STAs, and an uplink multi-user (UL-MU) transmission in which a plurality of STAs simultaneously transmit data to the AP may be performed.

FIG. 8 illustrates a UL-MU transmission process according to an embodiment of the present invention. In order to perform the UL-MU transmission, the channel to be used and the transmission start time of each STA that performs uplink transmission should be adjusted. In order to efficiently schedule the UL-MU transmission, state information of each STA needs to be transmitted to the AP. According to an embodiment of the present invention, information for scheduling of a UL-MU transmission may be indicated through a predetermined field of a preamble of a packet and/or a predetermined field of a MAC header. For example, a STA may indicate information for UL-MU transmission scheduling through a predetermined field of a preamble or a MAC header of an uplink transmission packet, and may transmit the information to an AP. In this case, the information for UL-MU transmission scheduling includes at least one of buffer status information of each STA, and channel state information measured by each STA. The buffer status information of the STA may indicate at least one of whether the STA has uplink data to be transmitted, the access category (AC) of the uplink data and the size (or the transmission time) of the uplink data.

According to an embodiment of the present invention, the UL-MU transmission process may be managed by the AP. The UL-MU transmission may be performed in response to a trigger frame transmitted by the AP. The STAs simultaneously transmit uplink data a predetermined IFS (e.g., SIFS) time after receiving the trigger frame. The trigger frame solicits UL-MU transmission of STAs and may inform channel (or subchannel) information allocated to the uplink STAs. Upon receiving the trigger frame from the AP, a plurality of STAs transmit uplink data through each allocated channel (or, subchannel) in response thereto. After the uplink data transmission is completed, the AP transmits an ACK to the STAs that have successfully transmitted the uplink data. In this case, the AP may transmit a predetermined multi-STA block ACK (M-BA) as an ACK for a plurality of STAs.

In the non-legacy wireless LAN system, subcarriers of a specific number, for example, 26, 52, or 106 tones may be used as a resource unit (RU) for a subchannel-based access in a channel of 20 MHz band. Accordingly, the trigger frame may indicate identification information of each STA participating in the UL-MU transmission and information of the allocated resource unit. The identification information of the STA includes at least one of an association ID (AID), a partial AID, and a MAC address of the STA. Further, the information of the resource unit includes the size and placement information of the resource unit.

On the other hand, in the non-legacy wireless LAN system, a UL-MU transmission may be performed based on a contention of a plurality of STAs for a specific resource unit. For example, if an AID field value for a specific resource unit is set to a specific value (e.g., 0) that is not assigned to STAs, a plurality of STAs may attempt random access (RA) for the corresponding resource unit.

FIG. 9 illustrates a DL-MU transmission process according to an embodiment of the present invention. According to an embodiment of the present invention, RTS and/or CTS frames of a predetermined format may be used for NAV setting in the DL-MU transmission process. First, the AP transmits a multi-user RTS (MU-RTS) frame for NAV setting in the DL-MU transmission process. The duration field of the MU-RTS frame is set to a time until the end of the DL-MU transmission session. That is, the duration field of the MU-RTS frame is set based on a period until the downlink data transmission of the AP and ACK frame transmissions of the STAs are completed. The neighboring terminals of the AP set a NAV until the end of the DL-MU transmission session based on the duration field of the MU-RTS frame transmitted by the AP. According to an embodiment, the MU-RTS frame may be configured in the format of a trigger frame and requests simultaneous CTS (sCTS) frame transmissions of the STAs.

STAs (e.g., STA1 and STA2) receiving the MU-RTS frame from the AP transmit the sCTS frame. The sCTS frames transmitted by a plurality of STAs have the same waveform. That is, the sCTS frame transmitted by the STA1 on the first channel has the same waveform as the sCTS frame transmitted by the STA2 on the first channel According to an embodiment, the sCTS frame is transmitted on the channel indicated by the MU-RTS frame. The duration field of the sCTS frame is set to a time until the DL-MU transmission session is terminated based on the information of the duration field of the MU-RTS frame. That is, the duration field of the sCTS frame is set based on the period until the downlink data transmission of the AP and the ACK frame transmissions of the STAs are completed. In FIG. 9, neighboring terminals of STA1 and STA2 set a NAV until the end of the DL-MU transmission session based on the duration field of the sCTS frame.

According to an embodiment of the present invention, the MU-RTS frame and the sCTS frame may be transmitted on a 20 MHz channel basis. Accordingly, the neighboring terminals including legacy terminals can set the NAV by receiving the MU-RTS frame and/or the sCTS frame. When the transmission of the MU-RTS frame and the sCTS frame is completed, the AP performs a downlink transmission. FIG. 9 illustrates an embodiment in which the AP transmits DL-MU data to STA1 and STA2, respectively. The STAs receive the downlink data transmitted by the AP and transmit an uplink ACK in response thereto.

PPDU Format

Figure 10:
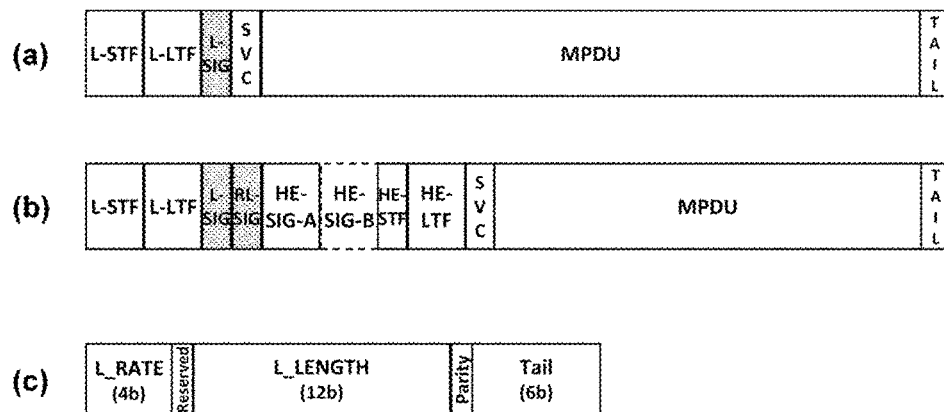
FIG. 10 illustrates an embodiment of a legacy PPDU format and a non-legacy PPDU format.

FIG. 10 illustrates an embodiment of a legacy PHY Protocol Data Unit (PPDU) format and a non-legacy PPDU format. More specifically, FIG. 10(a) illustrates an embodiment of a legacy PPDU format based on 802.11a/g, and FIG. 10(b) illustrates an embodiment of a non-legacy PPDU based on 802.11ax. In addition, FIG. 10(c) illustrates the detailed field configuration of L-SIG and RL-SIG commonly used in the PPDU formats.

Referring to FIG. 10(a), the preamble of the legacy PPDU includes a legacy short training field (L-STF), a legacy long training field (L-LTF), and a legacy signal field (L-SIG). In an embodiment of the present invention, the L-STF, L-LTF and L-SIG may be referred to as a legacy preamble. Referring to FIG. 10(b), the preamble of the HE PPDU includes a repeated legacy short training field (RL-SIG), a high efficiency signal A field (HE-SIG-A), a high efficiency signal B field, a high efficiency short training field (HE-STF), and a high efficiency long training field (HE-LTF) in addition to the legacy preamble. In an embodiment of the present invention, the RL-SIG, HE-SIG-A, HE-SIG-B, HE-STF and HE-LTF may be referred to as a non-legacy preamble. The detailed configuration of the non-legacy preamble may be modified according to the HE PPDU format. For example, HE-SIG-B may only be used in some formats among the HE PPDU formats.

A 64 FFT OFDM is applied to the L-SIG included in the preamble of the PPDU and the L-SIG consists of 64 subcarriers in total. Among these, 48 subcarriers excluding guard subcarriers, a DC subcarrier and pilot subcarriers are used for data transmission of the L-SIG. If a modulation and coding scheme (MCS) of BPSK, Rate=1/2 is applied, the L-SIG may include information of a total of 24 bits. FIG. 10(c) illustrates a configuration of 24-bit information of the L-SIG.

Referring to FIG. 10(c), the L-SIG includes an L_RATE field and an L_LENGTH field. The L_RATE field consists of 4 bits and represents the MCS used for data transmission. More specifically, the L_RATE field represents one of the transmission rates of 6/9/12/18/24/24/36/48/54 Mbps by combining the modulation scheme such as BPSK/QPSK/16-QAM/64-QAM with the code rate such as 1/2, 2/3, 3/4. When combining the information of the L_RATE field and the L_LENGTH field, the total length of the corresponding PPDU can be represented. The non-legacy PPDU sets the L_RATE field to a 6 Mbps which is the minimum rate.

The L_LENGTH field consists of 12 bits, and may represent the length of the corresponding PPDU by a combination with the L_RATE field. In this case, the legacy terminal and the non-legacy terminal may interpret the L_LENGTH field in different ways.

First, a method of interpreting the length of a PPDU using a L_LENGTH field by a legacy terminal or a non-legacy terminal is as follows. When the L_RATE field is set to 6 Mbps, 3 bytes (i.e., 24 bits) can be transmitted for 4 us, which is one symbol duration of 64 FFT. Therefore, by adding 3 bytes corresponding to the SVC field and the Tail field to the value of the L_LENGTH field and dividing it by 3 bytes, which is the transmission amount of one symbol, the number of symbols after the L-SIG is obtained on the 64FFT basis. The length of the corresponding PPDU, that is, the reception time (i.e., RXTIME) is obtained by multiplying the obtained number of symbols by 4 us, which is one symbol duration, and then adding a 20 us which is for transmitting L-STF, L-LTF and L-SIG. This can be expressed by the following Equation 1.

$$RXTIME(us) = \left(\left\lceil \frac{L\_LENGTH + 3}{3} \right\rceil\right) \times 4 + 20 \quad \text{[Equation 1]}$$

In this case, $\lceil x \rceil$ denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(byte) = \left(\left\lceil \frac{TXTIME - 20}{4} \right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

$$TXTIME \; (us) = T_{L\text{-}STF} + T_{L\text{-}LTF} + T_{L\text{-}SIG} T_{RL\text{-}SIG} +$$
$$T_{HE\text{-}SIG\text{-}A} + (T_{HE\text{-}SIG\text{-}B}) + T_{HE\text{-}STF} +$$
$$N_{HE\text{-}LTF} \cdot T_{HE\text{-}LTF} + T_{Data} \quad \text{[Equation 3]}$$

With reference to the above equations, the length of the PPDU is calculated based on the round-up value of L_LENGTH/3. Therefore, for any value of k, three different values of L_LENGTH={3 k+1, 3k+2, 3(k+1)} indicate the same PPDU length. According to an embodiment of the present invention, the non-legacy terminal may perform additional signaling using three different L_LENGTH values indicating the same PPDU length information. More specifically, values corresponding to 3k+1 and 3k+2 among the three different L_LENGTH values may be used to indicate the HE PPDU format.

Figure 11:
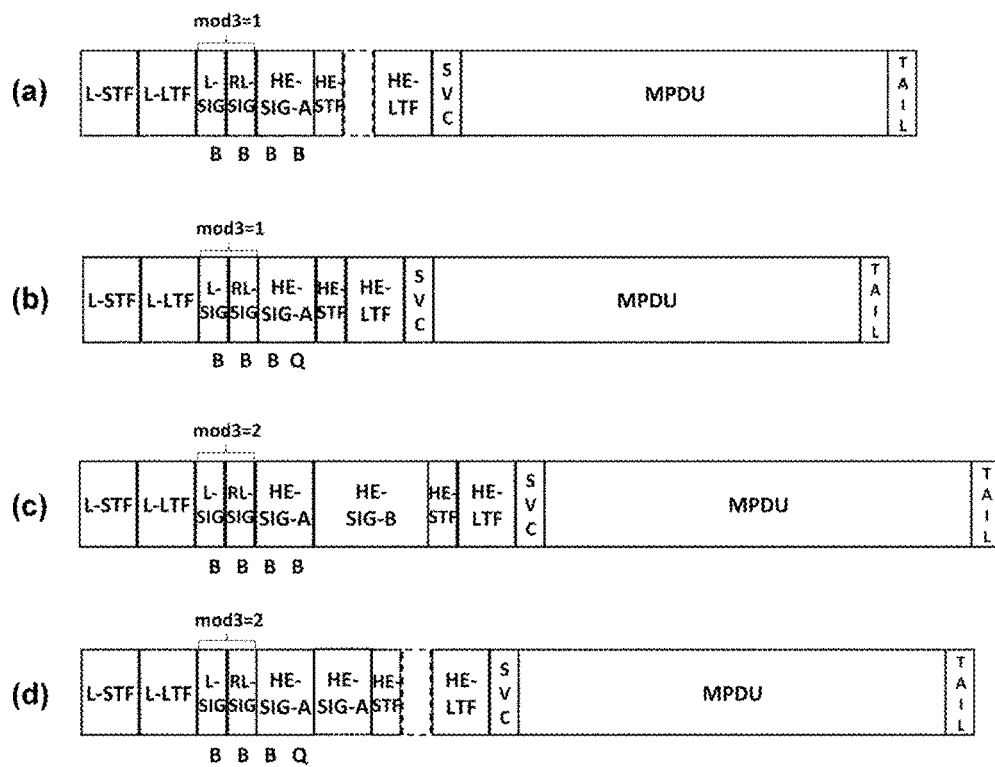
FIG. 11 illustrates various HE PPDU formats and an indication method thereof according to an embodiment of the present invention.

FIG. 11 illustrates various HE PPDU formats and an indication method thereof according to an embodiment of the present invention. According to an embodiment of the present invention, the HE PPDU format may be indicated based on the L_LENGTH field and HE-SIG-A of the corresponding PPDU. More specifically, the HE PPDU format is indicated based on at least one of the value of the L_LENGTH field and the modulation scheme applied to the HE-SIG-A symbol.

First, referring to FIG. 11(a), when the value of the L_LENGTH field is 3k+1 (i.e., when mod 3=1), the corresponding PPDU is an HE SU PPDU or an HE Trigger-based PPDU. The HE SU PPDU is a PPDU used for a single-user transmission between an AP and a single STA. Furthermore, the HE Trigger-based PPDU is an uplink PPDU used for a transmission that is a response to a trigger frame. HE SU PPDU and HE Trigger-based PPDU have the same preamble format. In the cases of the HE SU PPDU and the HE Trigger-based PPDU, two symbols of HE-SIG-A are modulated with BPSK and BPSK, respectively.

According to a further embodiment of the present invention illustrated in FIG. 11(b), when the value of the L_LENGTH field is 3k+1 and the two symbols of HE-SIG-A are modulated with BPSK and QBPSK, respectively, the corresponding PPDU is an extended PPDU. The extended PPDU is used as a new PPDU format other than the PPDU formats supported by 802.11ax.

Next, when the value of the L_LENGTH field is 3k+2 (i.e., when mod 3=2), the corresponding PPDU is an HE MU PPDU or an HE Extended Range (ER) SU PPDU. The HE MU PPDU is a PPDU used for a transmission to one or more terminals. The HE MU PPDU format is illustrate in FIG. 11(c) and additionally includes HE-SIG-B in the non-legacy preamble. In the case of the HE MU PPDU, the two symbols of HE-SIG-A are modulated with BPSK and BPSK, respectively. On the other hand, HE ER SU PPDU is used for a single-user transmission with a terminal in an extended range. The HE ER SU PPDU format is illustrated in FIG. 11(d), where HE-SIG-A of the non-legacy preamble is repeated on the time axis. In the case of the HE ER SU PPDU, the first two symbols of HE-SIG-A are modulated with BPSK and QBPSK, respectively. Thus, the non-legacy terminal can signal the PPDU format through the modulation scheme used for the two symbols of HE-SIG-A in addition to the value of the L_LENGTH field.

The HE MU PPDU illustrated in FIG. 11(c) may be used by an AP to perform a downlink transmission to a plurality of STAs. In this case, the HE MU PPDU may include scheduling information for a plurality of STAs to simultaneously receive the corresponding PPDU. In addition, the HE MU PPDU may be used by a single STA to perform an uplink transmission to the AP. In this case, the HE MU PPDU may transmit AID information of the receiver and/or the transmitter of the corresponding PPDU through a user specific field of the HE-SIG-B. Therefore, terminals receiving the HE MU PPDU may perform a spatial reuse operation based on the AID information obtained from the preamble of the corresponding PPDU. In addition, data transmission through some narrowband may be performed using the HE MU PPDU. Here, the narrowband may be a frequency band of less than 20 MHz. According to an embodiment, the HE MU PPDU may indicate allocation information of resource unit(s) to be used for a narrowband transmission through the HE-SIG-B.

More specifically, the resource unit allocation (RA) field of HE-SIG-B contains information on the resource unit partition type in a specific bandwidth (e.g., 20 MHz) of the frequency domain. Further, information of a STA assigned to each partitioned resource unit may be transmitted through the user specific field of the HE-SIG-B. The user specific field includes one or more user fields corresponding to each partitioned resource unit.

When a narrowband transmission using a part of the partitioned resource units is performed, the resource unit used for the transmission may be indicated through the user specific field of the HE-SIG-B. According to an embodiment, an AID of a receiver or a transmitter may be contained in a user field corresponding to resource unit(s) on which data transmission is performed among a plurality of partitioned resource units. In addition, a predetermined Null STA ID may be contained in user field(s) corresponding to the remaining resource unit(s) in which data transmission is not performed. According to another embodiment of the present invention, the narrowband transmission may be signaled through a first user field corresponding to a resource unit in which data transmission is not performed and a second user field corresponding to a resource unit in which data transmission is performed. More specifically, a predetermined null STA ID may be contained in the first user field, and the placement information of the resource unit(s) on which data transmission is performed may be indicated through the remaining subfields of the corresponding user field. Next, the AID of the receiver or transmitter may be contained in the second user field. Thus, the terminal may signal the narrowband transmission through the location information contained in the first user field and the AID information contained in the second user field. In this case, since user fields less than the number of partitioned resource units are used, the signaling overhead can be reduced.

Configuration of HE-SIG-A Field and HE-SIG-B Field in an HE PPDU

FIG. 12 illustrates an embodiment of a configuration of an HE-SIG-A field according to the HE PPDU format. HE-SIG-A consists of two symbols of 64 FFT, and indicates common information for reception of the HE PPDU. The first symbol of the HE-SIG-A is modulated with BPSK, and the second symbol of the HE-SIG-A is modulated with BPSK or QBPSK. In the HE ER SU PPDU, two symbols of the HE-SIG-A may be repeatedly transmitted. That is, the HE-SIG-A of the HE ER SU PPDU consists of four symbols, the first symbol and the second symbol of which have the same data bit, and the third symbol and the fourth symbol of which have the same data bit.

First, FIG. 12(a) illustrates a subfield configuration of the HE-SIG-A field of the HE SU PPDU. According to an embodiment, the HE-SIG-A field of the HE ER SU PPDU may be configured similarly. The function of each field included in HE-SIG-A will be described as follows.

The UL/DL field indicates a transmission direction of the corresponding PPDU. That is, the corresponding field indicates whether the corresponding PPDU is transmitted with uplink or is transmitted with downlink. The format field is used to differentiate an HE SU PPDU from an HE Trigger-based PPDU. The BSS color field consists of 6 bits and indicates an identifier of the BSS corresponding to a terminal that transmitted the corresponding PPDU. The spatial reuse field carries information such as signal to interference plus noise ratio (SINR), transmission power, etc., which can be referred to by terminals to perform spatial reuse transmission during the transmission of the corresponding PPDU.

The TXOP duration field indicates duration information for TXOP protection and NAV setting. The corresponding field sets the duration of the TXOP interval in which consecutive transmission is to be performed after the corresponding PPDU, so that the neighboring terminals set a NAV for the corresponding duration. The bandwidth field indicates the total bandwidth in which the corresponding PPDU is transmitted. According to an embodiment, the bandwidth field may consist of 2 bits and indicate one of 20 MHz, 40 MHz, 80 MH and 160 MHz (including 80+80 MHz). The MCS field indicates an MCS value applied to the data field of the corresponding PPDU. The CP+LTF size field indicates the duration of the cyclic prefix (CP) or guard interval (GI) and the size of the HE-LTF. More specifically, the corresponding field indicates the combination of the HE-LTF size used among 1×, 2×, and 4× HE-LTF, and the CP (or GI) value used in the data field among 0.8 us, 1.6 us, and 3.2 us.

The coding field may indicate which coding scheme is used between binary convolutional code (BCC) and low density parity check (LDPC). In addition, the corresponding field may indicate whether an extra OFDM symbol for LDPC is present. The number of space time streams (NSTS) field indicates the number of space-time streams used for MIMO transmission. The space time block coding (STBC) field indicates whether space-time block coding is used. The transmit beamforming (TxBF) field indicates whether beamforming is applied to the transmission of the corresponding PPDU. The dual carrier modulation (DCM) field indicates whether dual carrier modulation is applied to the data field. The dual carrier modulation transmits the same information through two subcarriers in order to cope with narrowband interference. The packet extension field indicates which level of packet extension is applied to the PPDU. The beam change field indicates whether the part before the HE-STF of the corresponding PPDU is mapped spatially different from the HE-LTF. The CRC field and the tail field are used to determine the authenticity of the HE-SIG-A field information and to initialize the BCC decoder, respectively.

Next, FIG. 12(b) illustrates a subfield configuration of the HE-SIG-A field of the HE MU PPDU. Among the subfields shown in FIG. 12(b), the same subfields as those shown in FIG. 12(a) will not be described.

The UL/DL field indicates the transmission direction of the corresponding PPDU. That is, the corresponding field indicates whether the corresponding PPDU is transmitted with uplink or is transmitted with downlink. The bandwidth field of the HE MU PPDU may indicate extra bandwidths in addition to the bandwidths of the HE SU PPDU. That is, the bandwidth field of the HE MU PPDU consists of 3 bits and indicates one of 20 MHz, 40 MHz, 80 MHz, 160 MHz (including 80+80 MHz), and predetermined non-contiguous bands. The specific embodiments of the predetermined non-contiguous bands will be described later.

The SIG-B MCS field indicates the MCS applied to the HE-SIG-B field. Depending on the amount of information that requires signaling, variable MCS between MSC0 and MSC5 can be applied to the HE-SIG-B. The CP+LTF size field indicates the duration of the CP or GI and the size of the HE-LTF. The corresponding field indicates the combination of the HE-LTF size used among 2× and 4×HE-LTF, and the CP (or GI) value used in the data field among 0.8 us, 1.6 us, and 3.2 us.

The SIG-B compression field indicates whether to use a compression mode of the HE-SIG-B field. When the HE MU PPDU is transmitted using an MU-MIMO in the full bandwidth, the resource unit allocation information for each 20

MHz band becomes unnecessary. Therefore, in the full bandwidth MU-MIMO transmission, the SIG-B compression field indicates the compression mode of the HE-SIG-B field. In this case, the common field containing the resource unit allocation field is not present in the HE-SIG-B field. The SIG-B DCM field indicates whether the HE-SIG-B field is modulated with the DCM for reliable transmission of the HE-SIG-B field. The number of HE-SIG-B symbols field indicates information on the number of OFDM symbols in the HE-SIG-B field.

On the other hand, when the HE MU PPDU is transmitted in a band of 40 MHz or more as described later, the HE-SIG-B may consist of two kinds of content channels in units of 20 MHz. The content channels are referred to as HE-SIG-B content channel 1 and HE-SIG-B content channel 2, respectively. According to an embodiment of the present invention, the number of HE-SIG-B symbols in each channel can be kept similar by differentiating MCSs applied to the HE-SIG-B content channel 1 and the HE-SIG-B content channel 2, respectively. The HE-SIG-A field of the HE MU PPDU may include a SIG-B dual MCS field. In this case, it is indicated through the corresponding field whether the MCSs applied to the HE-SIG-B content channel 1 and the HE-SIG-B content channel 2 are different with each other.

According to the embodiment of the present invention, when the SIG-B compression field indicates the compression mode of the HE-SIG-B field (i.e., when the full bandwidth MU-MIMO transmission is indicated), a specific field of the HE-SIG-A may indicate information on the number of MU-MIMO users. For example, when the full bandwidth MU-MIMO transmission is performed, the HE-SIG-B content channel 1 and the HE-SIG-B content channel 2 do not need to distribute the amount of information through different MCSs. Therefore, when the SIG-B compression field indicates the compression mode of the HE-SIG-B field, the SIG-B dual MCS field of the HE-SIG-A may indicate information on the number of MU-MIMO users. Likewise, when the full bandwidth MU-MIMO transmission is performed, information on the number of symbols in each HE-SIG-B content channel need not be delivered separately. Therefore, when the SIG-B compression field indicates the compression mode of the HE-SIG-B field, the number of HE-SIG-B symbols field in the HE-SIG-A may indicate the information on the number of MU-MIMO users. As described above, in the compression mode in which the resource unit allocation field of the HE-SIG-B is omitted, information on the number of MU-MIMO users may be indicated through a specific subfield of the HE-SIG-A.

According to a further embodiment of the present invention, some of the subfields of the HE-SIG-A field of the HE MU PPDU may signal information different from the above embodiments through a combination of a plurality of subfields. As described above, the HE MU PPDU may not only be used by the AP to perform a downlink transmission to a plurality of STAs, but may also be used by a single STA to perform an uplink transmission to the AP. According to an embodiment of the present invention, information based on the value indicated by the UL/DL field, the specific subfield of the HE-SIG-A field of the HE MU PPDU may be set differently from each other or indicate different information.

First, the bandwidth field may indicate different information based on the value indicated by the UL/DL field. When the UL/DL field indicates downlink transmission, the bandwidth field indicates any one of 20 MHz, 40 MHz, 80 MHz, 160 MHz (including 80+80 MHz), and predetermined non-contiguous bands. In a 3-bit bandwidth field, values of 0 to 3 indicate 20 MHz, 40 MHz, 80 MHz, and 160 MHz (including 80+80 MHz), respectively, and any one of values 4 to 7 indicates one of the predetermined non-contiguous bands. However, a PPDU with non-contiguous bandwidth may only be used for downlink transmission. Therefore, specific values of the bandwidth field (i.e., one or more values among 4 to 7) may indicate different information between when the UL/DL field indicates downlink transmission and when it indicates uplink transmission.

For example, if the UL/DL field indicates an uplink transmission, the bandwidth field indicates any one of 20 MHz, 40 MHz, 80 MHz, 160 MHz (including 80+80 MHz), and a predetermined narrow bandwidths. That is, in the 3-bit bandwidth field, values of 0 to 3 indicate 20 MHz, 40 MHz, 80 MHz, and 160 MHz (including 80+80 MHz), respectively, and any one of values 4 to 7 may indicate one of the predetermined narrow bandwidths. According to an embodiment, the predetermined narrow bandwidth may include a left-106-tone and a right-106-tone. In this case, among the 242-tone constituting a 20 MHz primary channel, the left-106-tone indicates the low-frequency 106-tone resource unit, and the right-106-tone indicates the high-frequency 106-tone resource unit. However, the present invention is not limited thereto, and the predetermined narrow bandwidth may include one or more of a 26-tone resource unit, a 52-tone resource unit, a 106-tone resource unit, or a combination thereof.

As described above, data transmission through a predetermined narrowband within the 20 MHz band may be performed when the UL MU PPDU is transmitted. The allocation information of the resource unit to be used for the narrowband transmission may be indicated through the resource unit allocation field and the user specific field of the HE-SIG-B. However, in this case, the signaling overhead may be large. Thus, according to an embodiment of the present invention, the uplink narrowband transmission may be indicated through the bandwidth field of the HE-SIG-A of the HE MU PPDU.

Next, the SIG-B compression field may be set differently based on the value indicated by the UL/DL field. The SIG-B compression field indicates whether to use the compression mode of the HE-SIG-B field. When the SIG-B compression field indicates the compression mode of the HE-SIG-B field, the common field containing the resource unit allocation field is not present in the HE-SIG-B field. According to the embodiment of the present invention, the SIG-B compression field may be set according to different rules between when the UL/DL field indicates downlink transmission and when it indicates uplink transmission.

More specifically, when the UL/DL field indicates downlink transmission, the SIG-B compression field indicates whether to perform the full bandwidth MU-MIMO transmission. That is, when the full-bandwidth MU-MIMO transmission is performed, the value of the SIG-B compression field is set to 1. Otherwise, the value of the SIG-B compression field is set to 0. However, the signaling of the resource unit allocation field may be unnecessary when a UL MU PPDU is transmitted by a single STA. Therefore, when the UL/DL field indicates uplink transmission, the value of the SIG-B compression field may be always set to 1. That is, when the UL/DL field indicates uplink transmission, the SIG-B compression field may always indicate that the common field is not present in the HE-SIG-B field. Although the full bandwidth MU-MIMO transmission is not performed, the compression mode of the HE-SIG-B field may be used to reduce the signaling overhead of the HE-SIG-B of the uplink transmission. Therefore, the common field may be omitted from the HE-SIG-B field of the UL MU PPDU.

Next, the number of HE-SIG-B symbols field may indicate different information based at least in part on the value indicated by the UL/DL field. More specifically, the number of HE-SIG-B symbols field may indicate different information based on the value indicated by the UL/DL field and the value of the SIG-B compression field.

The number of HE-SIG-B symbols field basically indicates the number of OFDM symbols in the HE-SIG-B field. However, as in the embodiments described above, when the UL/DL field indicates downlink transmission and the SIG-B compression field indicates the compression mode of the HE-SIG-B field, the number of HE-SIG-B symbols field in the HE-SIG-A may indicate the information on the number of MU-MIMO user. In this case, the user specific field of the HE-SIG-B field may consist of a user field for MU-MIMO allocation. Meanwhile, when the value of the SIG-B compression field in the UL MU PPDU is set to 1, it may be intended to omit the resource unit allocation field rather than to indicate the full bandwidth MU-MIMO transmission. Therefore, when the UL/DL field indicates uplink transmission and the SIG-B compression field indicates the compression mode of the HE-SIG-B field, the number of HE-SIG-B symbols field in the HE-SIG-A may indicate the number of OFDM symbols in the HE-SIG-B field as in the basic definition. In this case, the user specific field of the HE-SIG-B field may consist of a user field for non-MU-MIMO allocation. According to an embodiment, since the UL MU PPDU is transmitted to a single AP, the user specific field of the HE-SIG-B field may include only one user field for the non-MU-MIMO allocation.

Next, FIG. 12(c) illustrates a subfield configuration of the HE-SIG-A field of the HE trigger-based PPDU. Among the subfields shown in FIG. 12(c), the same subfields as those shown in FIG. 12(a) or 12(b) will not be described.

The format field is used to differentiate an HE SU PPDU from an HE Trigger-based PPDU. Also, the HE Trigger-based PPDU includes the above-described BSS color field and TXOP duration field. The spatial reuse field of the HE Trigger-based PPDU consists of 16 bits and carries information for spatial reuse operation in units of 20 MHz or 40 MHz according to the total bandwidth. The bandwidth field consists of 2 bits and may indicate one of 20 MHz, 40 MHz, 80 MHz and 160 MHz (including 80+80 MHz).

FIG. 13 illustrates a configuration of an HE-SIG-B field according to an embodiment of the present invention. The HE-SIG-B field is present in the HE MU PPDU and is transmitted in units of 20 MHz. In addition, the HE-SIG-B field indicates information necessary for receiving the HE MU PPDU. As illustrated in FIG. 13(a), the HE-SIG-B consists of a common field and a user specific field.

FIG. 13(b) illustrates an embodiment of a subfield configuration of the common field of the HE-SIG-B. First, the common field includes a resource unit allocation (RA) field. FIG. 13(c) illustrates an embodiment of the RA field.

Referring to FIG. 13(c), the RA field contains information on resource unit allocation of a specific bandwidth (e.g., 20 MHz) in the frequency domain. More specifically, the RA field consists in units of 8 bits, and indexes the size of the resource units constituting the specific bandwidth and their placement in the frequency domain. Further, the RA field may indicate the number of users in each resource unit. When the total bandwidth through which the PPDU is transmitted is greater than a predetermined bandwidth (e.g., 40 MHz), the RA field may be set to a multiple of 8 bits to carry information in units of the specific bandwidth.

Each partitioned resource unit is generally assigned to one user. However, resource units of a certain bandwidth (e.g., 106-tones) or more can be assigned to a plurality of users using MU-MIMO. In this case, the RA field may indicate the number of users in the corresponding resource unit. In addition, the RA field may indicate, through a predetermined index, a specific resource unit in which a user specific field is not transmitted, i.e., a specific resource unit (i.e., an empty RU) that is not assigned to the user. According to an embodiment, the specific resource unit includes a resource unit (RU) having a bandwidth of a multiple of 20 MHz channels, i.e., 242-tone RU, 484-tone RU, 996-tone RU, and the like. In an empty RU indicated by the index value, data transmission is not performed. In this manner, the terminal may signal non-contiguous channel allocation information in units of 20 MHz through a predetermined index of the RA field of the HE-SIG-B.

According to an embodiment of the present invention, when a PPDU is transmitted through a total bandwidth of 80 MHz or more, the common field further includes a field (hereinafter, referred to as C26 field) indicating whether a user is allocated to a center 26-tone RU of 80 MHz. The C26 field may consist of a 1-bit indicator before or after the RA field in the common field.

On the other hand, the user specific field consists of a plurality of user fields, and carries information for a designated STA to each allocated resource unit. The total number of user fields to be included in the user specific field may be determined based on the RA field and the C26 field. A plurality of user fields are transmitted in units of a user block field. The user block field is made up of an aggregation of two user fields, a CRC field and a tail field. Depending on the total number of user fields, the last user block field may contain information for one or two STAs. For example, if a total of three users (i.e., STA1, STA2, and STA3) are designated, information for STA1 and STA2 may be coded and transmitted along with the CRC/tail field in the first user block field, and information for STA3 may be coded and transmitted along with the CRC/tail field in the last user block field.

FIGS. 13(d)-1 and 13(d)-2 illustrate embodiments of the subfield configuration of the user field of the HE-SIG-B, respectively. FIG. 13(d)-1 illustrates a user field for an OFDMA transmission, and FIG. 13(d)-2 illustrates a user field for a MU-MIMO transmission. Each user field indicates a receiver AID of the corresponding resource unit. Exceptionally, when the HE MU PPDU is used for an uplink transmission, the user field may indicate a transmitter AID. When one user is allocated to one resource unit (i.e., non-MU-MIMO allocation), the user field includes a number of space time streams (NSTS) field, a TxBF field, an MCS field, a DCM field and a coding field as illustrated in FIG. 13(d)-1. On the other hand, when a plurality of users are allocated to one resource unit (i.e., MU-MIMO allocation), the user field includes a spatial configuration field (SCF), an MCS field, a DCM field, and a coding field as illustrated in FIG. 13(d)-2. Each STA that receives a PPDU through an MU-MIMO allocation should identify the location and number of spatial streams for it in the corresponding resource unit. To this end, the user field for the MU-MIMO transmission includes a spatial configuration field (SCF).

FIG. 13(e) illustrates an embodiment of the SCF of the HE-SIG-B. The SCF indicates the number of spatial streams for each STA and the total number of spatial streams in the MU-MIMO allocation. Each STA identifies the OFDMA and/or MIMO allocation of the corresponding PPDU through the RA field and identifies whether the STA receives data through the MU-MIMO allocation according to the order indicated in the user specific field. When the STA receives data through the non-MU-MIMO allocation, the user field is interpreted according to the format of FIG. 13(d)-1. However, when the STA receives data through the MU-MIMO allocation, the user field is interpreted according to the format of FIG. 13(d)-2. On the other hand, when the SIG-B compression field indicates the full bandwidth MU-MIMO, the RA field is not present in the HE-SIG-B. In this case, since all the STAs signaled in the user specific field receive data through the MU-MIMO allocation, the STAs interpret the user field according to the format of FIG. 13(d)-2.

As described in the above embodiments, when the SIG-B compression field indicates the full bandwidth MU-MIMO, the specific subfield of the HE-SIG-A may indicate the information on the number of MU-MIMO users. That is, when the SIG-B compression field indicates the compression mode of the HE-SIG-B field, the number of HE-SIG-B symbols field of the HE-SIG-A may indicate the information on the number of MU-MIMO users. According to a further embodiment of the present invention, when the SIG-B compression field indicates the full bandwidth MU-MIMO, the configuration of the user specific field of the HE-SIG-B may be identified based on the information on the number of MU-MIMO users indicated by the number of HE-SIG-B symbols field. For example, the type of the user field constituting the user specific field may be determined to be either a user field for MU-MIMO allocation or a user field for non-MU-MIMO allocation based on the information on the number of MU-MIMO users.

More specifically, when the SIG-B compression field indicates the full bandwidth MU-MIMO and the number of HE-SIG-B symbols field indicates two or more users, the user specific field of the HE-SIG-B consists of user fields for MU-MIMO allocation. According to an embodiment, the number of HE-SIG-B symbols field may be set to a value of 1 or more when it indicates two or more users. In this case, the receiving terminal of the corresponding PPDU may receive data through the MU-MIMO allocation.

However, when the SIG-B compression field indicates the full bandwidth MU-MIMO and the number of HE-SIG-B symbols field indicates a single user, the user specific field of the HE-SIG-B consists of one user field for non-MU-MIMO allocation. According to an embodiment, the number of HE-SIG-B symbols field may be set to 0 when it indicates a single user. In this case, the receiving terminal of the corresponding PPDU may receive data through non-MU-MIMO allocation. It is because the transmission is not interpreted as an MU-MIMO transmission when the SIG-B compression field indicates full bandwidth MU-MIMO but a single recipient is indicated. When only one user is allocated for MU-MIMO transmission, spatial stream information for the single user cannot be signaled through the SCF of the user field for MU-MIMO allocation shown in FIGS. 13(d) and 13(e). Thus, when the full bandwidth MU-MIMO is indicated with a single user, the user specific field of the HE-SIG-B may consist of a user field for non-MU-MIMO allocation. The configuration of the user specific field of the HE-SIG-B based on the information on the number of MU-MIMO users can be applied to both the uplink and downlink MU PPDUs.

According to a further embodiment of the present invention, in the UL MU PPDU, the common field may not always be present in the HE-SIG-B field. Signaling of the C26 field and the RA field in the common field may be unnecessary when a single STA transmits a UL MU PPDU. Therefore, when the UL/DL field indicates uplink transmission, the common field is not present in the HE-SIG-B field. According to an embodiment, the value of the SIG-B compression field of the HE-SIG-A in the UL MU PPDU may be set to 1 to explicitly signal that the common field is not included in the HE-SIG-B. However, in this case, the full bandwidth MU-MIMO transmission is not performed, but the compression mode of the HE-SIG-B field may be used to reduce the signaling overhead of the HE-SIG-B in the uplink transmission. According to another embodiment of the present invention, in the UL MU PPDU, the compression mode of the HE-SIG-B field may be implicitly indicated regardless of the value of the SIG-B compression field, so that the common field is not present in the HE-SIG-B field.

Also, according to the embodiment of the present invention, the user specific field of the HE-SIG-B in the UL MU PPDU may consist of one user field for non-MU-MIMO allocation. That is, even if the value of the SIG-B compression field of the UL MU PPDU is set to 1 so that the compression mode of the HE-SIG-B field (or the full bandwidth MU-MIMO) is indicated, the user specific field of the HE-SIG-B may consist of a user field for non-MU-MIMO allocation. In this way, when a single STA performs uplink transmission to a single AP, a non-MU-MIMO-based (or OFDMA-based) user field is transmitted instead of a MU-MIMO-based user field so that information on the number of space-time streams to be received by the receiving terminal can be accurately transmitted.

A terminal according to an embodiment of the present invention may generate an HE MU PPDU including an HE-SIG-A field and an HE-SIG-B field configured according to the above-described methods, and transmit the generated HE MU PPDU. The terminal receiving the HE MU PPDU may decode the corresponding PPDU based on information obtained from the HE-SIG-A field of the received PPDU. In addition, the terminal may decode the HE-SIG-B field based on the information obtained from the HE-SIG-A field of the received HE MU PPDU. As described in the above embodiments, the configuration of the HE-SIG-B may be identified based on information obtained from at least one subfield of the HE-SIG-A. For example, the configuration of the HE-SIG-B may be identified based on at least one of the number of HE-SIG-B symbols field, the SIG-B compression field, and a combination thereof.

FIGS. 14 to 15 illustrate specific embodiments in which a single STA transmits an UL MU PPDU to an AP.

First, FIG. 14 illustrates an embodiment in which the STA performs a UL MU PPDU transmission through a narrowband. Here, the narrowband may be a resource unit less than a 20 MHz bandwidth. As shown in FIG. 14(a), the STA can increase the transmission distance of data by concentrating the transmission power on a specific resource unit of a narrowband. FIGS. 14(b) to 14(d) illustrate various embodiments for signaling such narrowband transmission.

First, the narrowband transmission may be signaled through at least one subfield of the HE-SIG-A as shown in FIG. 14(b). When the HE MU PPDU is used for uplink transmission, the bandwidth field of the HE-SIG-A may indicate either 20 MHz, 40 MHz, 80 MHz, 160 MHz (including 80+80 MHz) or a predetermined narrow bandwidth. That is, in the 3-bit bandwidth field, values of 0 to 3 indicate 20 MHz, 40 MHz, 80 MHz, and 160 MHz (including 80+80 MHz), respectively, and any one of values 4 to 7 indicates one of the predetermined narrow bandwidths. According to an embodiment, the predetermined narrow bandwidth may include a left-106-tone and a right-106-tone. In this case, among the 242-tone constituting a 20 MHz primary channel, the left-106-tone indicates the low-frequency 106-tone resource unit, and the right-106-tone indicates the high-frequency 106-tone resource unit. However, the present invention is not limited thereto, and the predetermined narrow bandwidth may include one or more of a 26-tone resource unit, a 52-tone resource unit, a 106-tone resource unit, or a combination thereof.

Next, the narrowband transmission may be signaled through a null STA ID contained in the user field of the HE-SIG-B as shown in FIG. 14(c). More specifically, the RA field of the HE-SIG-A may indicate information on the resource unit partition type in a particular channel. For example, if the bandwidth of 20 MHz is partitioned into two 106-tone resource units based on the OFDMA and the center 26-tone resource unit is not used, then the RA field may signal "0110zzzz" as shown in FIG. 14(c). In this case, an AID of the receiver or the transmitter may be inserted into the user field corresponding to the resource unit used for uplink data transmission between the partitioned two 106-tone resource units. On the other hand, a null STA ID may be inserted into the user fields corresponding to the remaining resource units through which data transmission is not performed. For example, if data is transmitted only through the second RU between two 106-tone resource units, a null STA ID may be inserted into the first user field.

According to another embodiment of the present invention, as shown in FIG. 14(d), index values of the uplink resource unit allocation may be newly defined in the RA field of the HE-SIG-B for the narrowband transmission. More specifically, the RA field of the HE-SIG-B may index a specific 106-tone RU on which uplink transmission is performed. In this case, since only one user field corresponding to the resource unit indicated in the RA field is carried, the signaling overhead can be greatly reduced. According to an embodiment, the index values of the uplink resource unit allocation may be used among the unassigned (i.e., TBD) indices of the RA field configuration for DL-MU transmission. According to another embodiment, the index values of the uplink resource unit allocation may be newly defined in the RA field.

FIG. 15 illustrates an embodiment in which the STA performs UL MU PPDU transmission through a bandwidth of 20 MHz or more. As shown in FIG. 15(a), the uplink transmission using the HE MU PPDU may be performed not only through the narrowband but also through the full bandwidth of 20 MHz, 40 MHz, 80 MHz or 160 MHz (including 80+80 MHz). In this case, the bandwidth field of the HE-SIG-A indicates the total bandwidth of the PPDU. In addition, the SIG-B compression field may be always set to 1 as shown in FIG. 15(b) so that the common field is omitted from the HE-SIG-B field.

As described in the above embodiments, when the UL/DL field indicates downlink transmission and the SIG-B compression field indicates the compression mode of the HE-SIG-B field, the number of HE-SIG-B symbols field of the HE-SIG-A may indicate the information on the number of MU-MIMO users. In this case, the user specific field of the HE-SIG-B field may consist of user fields for MU-MIMO allocation. However, when the UL/DL field indicates uplink transmission and the SIG-B compression field indicates the compression mode of the HE-SIG-B field as in the embodiment of FIG. 15, the number of HE-SIG-B symbols field may indicate the number of OFDM symbols in the HE-SIG-B field as in the basic definition. In this case, the user specific field of the HE-SIG-B field may consist of a user field for non-MU-MIMO allocation.

Figure 16:
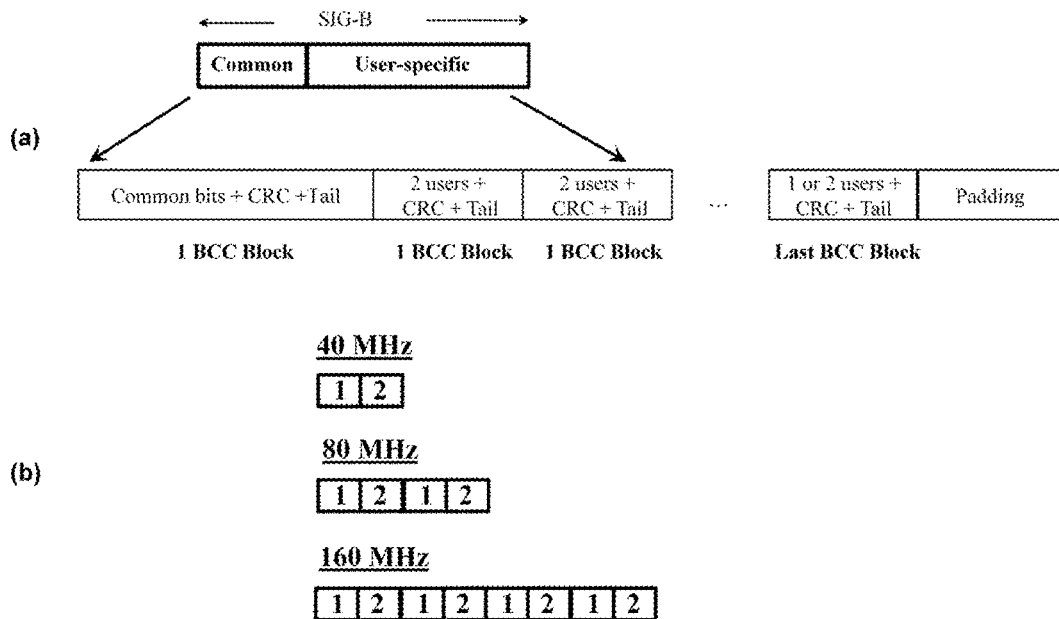
FIG. 16 illustrates an encoding structure and a transmission method of the HE-SIG-B according to an embodiment of the present invention.

FIG. 16 illustrates an encoding structure and a transmission method of the HE-SIG-B according to an embodiment of the present invention. FIG. 16(a) illustrates the encoding structure of the HE-SIG-B, and FIG. 16(b) illustrates the transmission method of the HE-SIG-B in a bandwidth of 40 MHz or more.

Referring to FIG. 16(a), the HE-SIG-B consists of a common field and a user specific field. The detailed configuration of the common field and the user specific field is as described in the embodiment of FIG. 13. Each user field of the user specific field is arranged in order of allocated users in the resource unit arrangement indicated by the RA field of the common field.

The user specific field consists of a plurality of user fields, and a plurality of user fields are transmitted in units of a user block field. As described above, the user block field is made up of an aggregation of two user fields, a CRC field, and a tail field. If the total number of user fields is odd, the last user block field may contain one user field. At the end of the HE-SIG-B, padding may be added along the OFDM symbol boundary.

Referring to FIG. 16(b), HE-SIG-B is separately encoded on each 20 MHz band. In this case, the HE-SIG-B may consist of a maximum of two contents in units of 20 MHz, that is, an HE-SIG-B content channel 1 and an HE-SIG-B content channel 2. In the embodiment of FIG. 16(b), each box represents a 20 MHz band, and "1" and "2" in the boxes represent the HE-SIG-B content channel 1 and the HE-SIG-B content channel 2, respectively. Each HE-SIG-B content channel in the total band is arranged in order of the physical frequency band. That is, the HE-SIG-B content channel 1 is transmitted in the lowest frequency band, and the HE-SIG-B content channel 2 is transmitted in the next higher frequency band. Such a content channel configuration is then duplicated through content duplication in the next higher frequency bands. For example, for the first to fourth channels with an increasing order of the frequency constituting the entire 80 MHz band, the HE-SIG-B content channel 1 is transmitted on the first channel and the third channel, and the HE-SIG-B content channel 2 is transmitted on the second channel and the fourth channel. Likewise, for the first to eighth channels with an increasing order of the frequency constituting the entire 160 MHz band, the HE-SIG-B content channel 1 is transmitted on the first channel, the third channel, the fifth channel and the seventh channel, and the HE-SIG-B content channel 2 is transmitted on the second channel, the fourth channel, the sixth channel and the eighth channel. When the terminal can decode the HE-SIG-B content channel 1 through at least one channel and decode the HE-SIG-B content channel 2 through the other at least one channel, information on the MU PPDU configuration of the total bandwidth can be obtained. On the other hand, when the total bandwidth is 20 MHz, only one SIG-B content channel is transmitted.

Non-Contiguous Channel Allocation

Hereinafter, a non-contiguous channel allocation method and a signaling method thereof according to an embodiment of the present invention will be described with reference to FIGS. 17 to 21. In the embodiment of the present invention, non-contiguous channel allocation refers to channel allocation in which a band occupied by the transmitted packet (i.e., PPDU) includes at least one non-contiguous channel (or non-contiguous resource unit). However, a full bandwidth 80+80 MHz channel is regarded as a contiguous channel like a full bandwidth 160 MHz channel. Thus, a non-contiguous channel (or non-contiguous PPDU) in the embodiments of the present invention may refer to non-contiguous channels except for the full bandwidth 80+80 MHz channel.

In the following embodiments and drawings, the P20 channel indicates a 20 MHz primary channel, the S20 channel indicates a 20 MHz secondary channel, the S40 channel indicates a 40 MHz secondary channel, and the S80 channel indicates an 80 MHz secondary channel, respectively. Also, the S40A channel indicates the first 20 MHz channel constituting the S40 channel, and the S40B channel indicates the second 20 MHz channel constituting the S40 channel. Similarly, the S80A channel, the S80B channel, the S80C channel, and the S80D channel indicate the first 20 MHz channel, the second 20 MHz channel, the third 20 MHz channel, and the fourth 20 MHz channel constituting the S80 channel, respectively.

In the embodiment of the present invention, a transmitter (e.g., an AP) signals non-contiguous channel allocation information through embodiments illustrated in each figure or combinations thereof. The transmitter may perform a CCA of multiple channels for a wideband packet transmission. In this case, the wideband may refer to a band having a total bandwidth of 40 MHz or more, but the present invention is not limited thereto. The transmitter transmits a packet through at least one channel which is idle based on the result of performing the CCA of multiple channels. In this case, when the packet is transmitted through a non-contiguous channel, the transmitter signals non-contiguous channel allocation information via a non-legacy preamble of the packet. As such, the transmitter transmits a wireless packet in which non-contiguous channel allocation information is signaled. A receiver (e.g., a STA) receives the wireless packet and obtains the non-contiguous channel allocation information from the received packet. The receiver decodes the received packet based on the obtained non-contiguous channel allocation information. In this case, the received packet may be an HE MU PPDU, but the present invention is not limited thereto.

Figure 17:
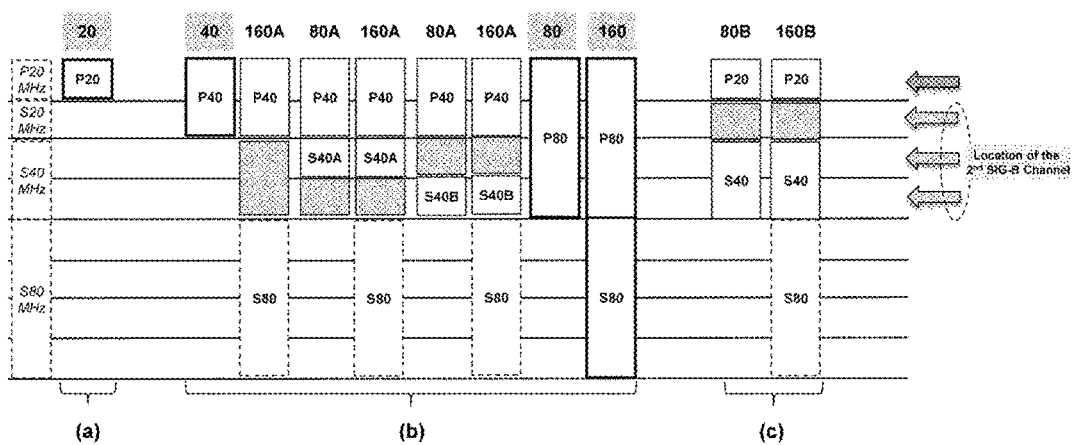
FIG. 17 illustrates a non-contiguous channel allocation method according to an embodiment of the present invention.

FIG. 17 illustrates a non-contiguous channel allocation method according to an embodiment of the present invention. According to the embodiment of FIG. 17, the location where at least one of the HE-SIG-B content channels is transmitted may be variable. In this case, the receiver should be able to variably set the decoding channel for receiving the HE-SIG-B content channel. In the embodiment of FIG. 17, it is assumed that the HE-SIG-B content channel 1 is transmitted through the P20 channel and the channel through which the HE-SIG-B content channel 2 is transmitted may vary. However, depending on the physical frequency order of the P20 channel within the P40 channel, the HE-SIG-B content channel 2 may be transmitted through the P20 channel. In this case, the channel through which the HE-SIG-B content channel 1 is transmitted may vary depending on the channel configuration. The non-contiguous channel allocation information according to the embodiment of the present invention may support at least some configurations among the channel configurations listed in FIG. 17.

FIG. 17(a) illustrates a channel configuration in which only the P20 channel is allocated among the P80 (i.e., primary 80 MHz) band. In this case, the HE-SIG-B content channel 2 is not transmitted in the P80 band. FIG. 17(b) illustrates a channel configuration in which the P40 channel is basically allocated among the P80 band. In this case, both the HE-SIG-B content channel 1 and the HE-SIG-B content channel 2 may be transmitted through at least the P40 channel According to the embodiment, a non-contiguous channel in which any one among the two 20 MHz channels, that is, the S40A channel and the S40B channel of the S40 channel is allocated may be used. When both the S40A channel and the S40B channel are allocated, a contiguous channel of 80 MHz or 160 MHz bandwidth is configured.

FIG. 17(c) illustrates a channel configuration in which only the P20 channel and the S40 channel are allocated among the P80 band. In this case, the HE-SIG-B content channel 1 may be transmitted through the P20 channel and the S40A channel, and the HE-SIG-B content channel 2 may be transmitted through the S40B channel. In the embodiments of FIG. 17(c), the HE-SIG-B content channel 1 and the HE-SIG-B content channel 2 may be transmitted based on the HE-SIG-B content channel transmission rule according to the embodiment of the present invention Meanwhile, due to the limitation of the number of bits in the bandwidth field of the HE-SIG-A, the bandwidth field may indicate some configurations among the above channel configurations. When the bandwidth field consists of 3 bits, the bandwidth field may index four additional non-contiguous channel allocation information. According to the embodiment of the present invention, the bandwidth field may indicate the total bandwidth information through which the PPDU is transmitted and some channel information to be punctured within the total bandwidth. In this case, the total bandwidth may be either 80 MHz bandwidth or 160 MHz (or 80+80 MHz) bandwidth. According to an embodiment of the present invention, the bandwidth field may index puncturing of the S20 channel shown in FIG. 17(c), and puncturing of at least one of two 20 MHz channels in the S40 channel shown in FIG. 17(b), respectively.

According to the embodiment of the present invention, in the channel configuration indicated by the bandwidth field of the HE-SIG-A, additional puncturing information may be indicated via the RA field of the HE-SIG-B. For example, when the bandwidth field indicates puncturing of one of two 20 MHz channels in the S40 channel at the total bandwidth of 80 MHz (e.g., the third and fifth channel configuration in FIG. 17(b)), the resource unit allocation field may indicate which 20 MHz channel in the S40 channel is punctured. Also, when the bandwidth field indicates puncturing of at least one of two 20 MHz channels in the S40 channel at the total bandwidth of 160 MHz or 80+80 MHz (e.g., the second, fourth and sixth channel configurations in FIG. 17(b)), the resource unit allocation field may indicate which 20 MHz channel in the S40 channel is punctured. In addition, when the bandwidth field indicates puncturing of at least one of two 20 MHz channels in the S40 channel in a total bandwidth of 160 MHz or 80+80 MHz (e.g., the second, fourth and sixth channel configurations in FIG. 17(b)), the resource unit allocation field may indicate additional puncturing in the S80 channel. Further, when the bandwidth field indicates puncturing of the S20 channel in the total bandwidth of 160 MHz or 80+80 MHz (e.g., the second channel configuration in FIG. 17(c)), the resource unit allocation field may indicate additional puncturing in the S80 channel.

Channels in which puncturing is indicated as described above are not assigned to the user. A terminal receiving the non-contiguous PPDU may obtain the total bandwidth information through which the PPDU is transmitted and the channel information to be punctured within the total bandwidth via the bandwidth field of the HE-SIG-A of the corresponding PPDU. Further, the terminal may obtain additional channel puncturing information via the RA field of the HE-SIG-B of the corresponding PPDU. The terminal decodes the PPDU based on the obtained non-contiguous channel allocation information.

Figure 18:
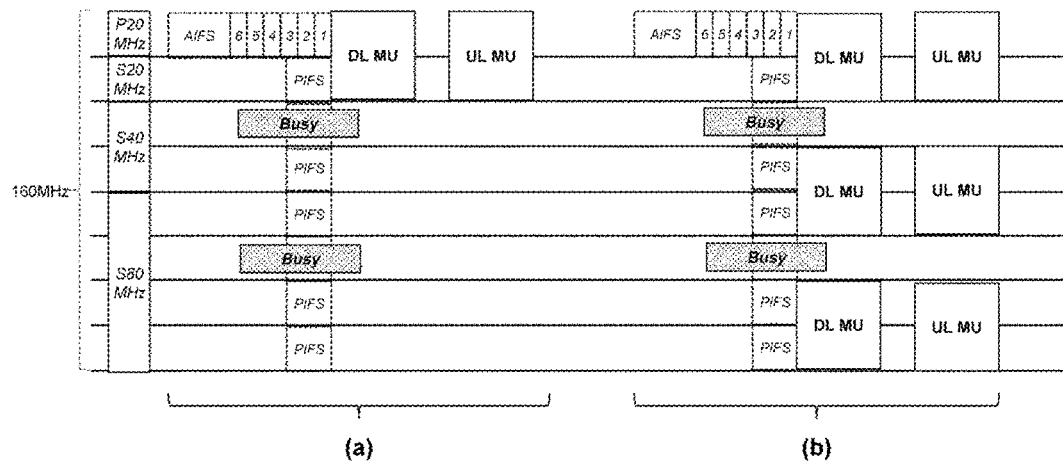
FIG. 18 illustrates a wideband access method according an embodiment of the present invention.

FIG. 18 illustrates a wideband access method according to an embodiment of the present invention. After the transmission of the previous PPDU is completed, the terminal having data to be transmitted performs a backoff procedure on the P20 channel. The backoff procedure may be started when the P20 channel is idle for an AIFS time. The terminal obtains a backoff counter within a range of a contention window (CW) for the backoff procedure. The terminal performs a CCA and decreases the backoff counter by one when the channel is idle. If the channel is busy, the terminal suspends the backoff procedure and resumes the backoff procedure an AIFS time after when the channel is idle again. When the backoff counter expires through the backoff procedure, the terminal may transmit data. In this case, the terminal performs a CCA for the secondary channels to transmit data for a PIFS time before the backoff counter expires.

The embodiment of FIG. 18 shows a situation in which the S40A channel and the S80B channel are busy in the 160 MHz band in which the CCA is performed. If at least a part of the secondary channels on which the CCA is performed is busy, the PPDU transmission band of the terminal may be determined based on the physical layer CCA indication information. The physical layer CCA indication information may be represented by a PHY-CCA.indication primitive defined in the wireless LAN standard.

More specifically, the PHY-CCA.indication is a primitive for the PHY to represent the current state of a channel (or medium) to the local MAC entity, and includes a state indicator and a channel indicator. The state indicator indicates a busy state or an idle state. If it is determined that the channel cannot be used as a result of the channel assessment by the physical layer, the value of the state indicator is set to the busy state. Otherwise, the value of the state indicator is the idle state. The channel indicator indicates a channel set including channel(s) in the busy state. If the value of the state indicator for a particular channel set is idle, the corresponding channel indicator is not present in the PHY-CCA.indication primitive.

FIG. 18(a) illustrates a wideband access method according to the first embodiment of the present invention. According to the first embodiment of the present invention, the physical layer CCA indication information may be represented by the PHY-CCA.indication primitive defined in the legacy wireless LAN system. That is, the channel indicator of the PHY-CCA.indication primitive may indicate only one of the four values of primary, secondary, secondary40, and secondary80. Thus, the channel indicator of the PHY-CCA.indication primitive indicates the first channel set including channel(s) in the busy state along the channel set order of P20 channel, S20 channel, S40 channel and S80 channel. According to the embodiment of FIG. 18(a), the channel indicator of the PHY-CCA.indication primitive indicates the S40 channel including the S40A channel in the busy state. That is, the physical layer may report the PHY-CCA.indication (BUSY, secondary401) to the MAC layer. The terminal may transmit the PPDU through the 40 MHz band (i.e., P40 channel) combining the P20 channel and the S20 channel determined to be idle.

However, in order to transmit the MU PPDU through the non-contiguous channel allocation as described in FIG. 17, it is necessary to transmit more detailed physical layer CCA indication information. In order to solve the problem, FIG. 18(b) illustrates a wideband access method according to the second embodiment of the present invention. According to the second embodiment of the present invention, the physical layer CCA indication information may be represented by the newly defined PHY-CCA.indication primitive. According to the second embodiment of the invention, the units of the channel set for which the CCA result is reported may be subdivided into each 20 MHz channel. That is, the channel indicator of the PHY-CCA.indication primitive may indicate at least one of primary, secondary, secondary40A, secondary40B, secondary80A, secondary80B, secondary80C, secondary80D, or similar types of 20 MHz channels.

According to the embodiment of the present invention, the channel indicator of the PHY-CCA.indication primitive reports all of the 20 MHz channel(s) determined to be busy, among eight 20 MHz channels constituting the 160 MHz band. According to the embodiment of FIG. 18(b), the channel indicator of the PHY-CCA.indication primitive indicates S40A channel and S80B channel which are in busy state. That is, the physical layer may report the PHY-CCA.indication (BUSY, {secondary40A, secondary80B}) to the MAC layer. The terminal transmits a PPDU using channels that are not busy. Referring to FIG. 18(b), the terminal may transmit a non-contiguous PPDU through channels (i.e., P20, S20, 540B, 580A, 580C, and 580D) other than the S40A channel and the 580B channel which are determined to be busy.

According to another embodiment of the present invention, the CCA result per 20 MHz channel may be reported in a bitmap representation. That is, the channel indicator of the PHY-CCA.indication primitive may indicate the busy/idle state for each 20 MHz channel in a bitmap form. For example, the channel indicator of the PHY-CCA.indication primitive may consist of a bitmap having a length of 8 bits. Herein, each bit is set to 1 if the corresponding 20 MHz channel is busy and each bit is set to 0 if the corresponding 20 MHz channel is idle. In this case, the first to eighth bits of the bitmap indicate the busy/idle state of each of the eight 20 MHz channels in the order of the lowest frequency to the highest frequency within the 160 MHz (80+80 MHz) bandwidth.

According to a further embodiment of the present invention, the physical layer may report the CCA results per 20 MHz channel only if the P20 channel is idle. That is, the channel indicator of the PHY-CCA.indication primitive indicates all of the 20 MHz secondary channel(s) determined to be busy among the eight 20 MHz channels constituting the 160 MHz band only when the P20 channel is idle. Also, if the CCA result per 20 MHz channel is reported in a bitmap representation, the bit corresponding to the P20 channel in the bitmap may be set to 0. If the P20 channel is busy, the channel indicator of the PHY-CCA.indication primitive does not indicate secondary channel information in units of 20 MHz. That is, the channel indicator of the PHY-CCA.indication primitive indicates only the first channel set including the busy channel(s) as in the legacy wireless LAN system.

Figure 19:
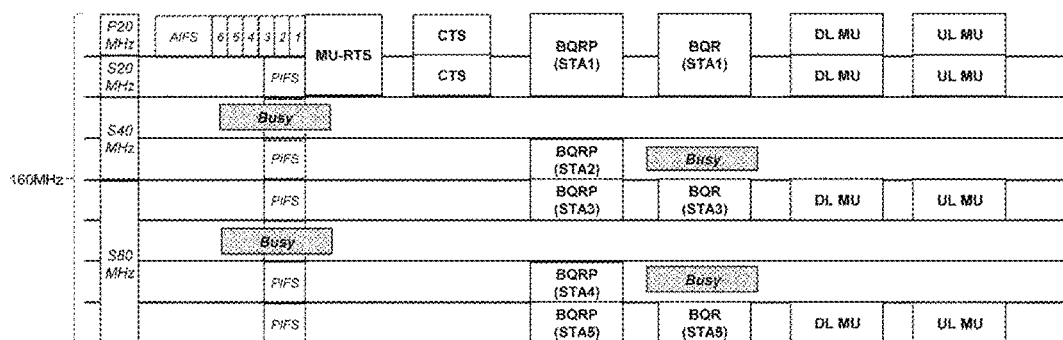
FIG. 19 illustrates an embodiment of a method of exchanging and signaling BQRP and BQR for transmitting a non-contiguous PPDU.

FIG. 19 illustrates an embodiment of a method of exchanging and signaling BQRP and BQR for transmitting a non-contiguous PPDU. Referring to FIG. 19, an AP that intends to transmit a DL MU PPDU may perform a CCA in a physical layer and transmit the DL MU PPDU using channels determined to be idle based on the CCA result. According to an embodiment, an MU-RTS frame may be transmitted to one or more STAs before transmission of the DL MU PPDU, and sCTS frames may be transmitted from STAs that have received the MU-RTS frame. However, the MU-RTS may only be transmitted in the form of PPDUs based on contiguous channel allocation such as non-HT, non-HT duplicate or HE SU PPDU. Therefore, when the S40A channel and the S80B channel are busy as in the embodiment of FIG. 19, the MU-RTS may be transmitted only through the 40 MHz band (i.e., the P40 channel) including the P20 channel and the S20 channel. The AP can receive sCTS frames transmitted in response to the MU-RTS frame from the STAs, but cannot identify the available channel of each STA only by exchanging the MU-RTS frame and the sCTS frame.

Therefore, according to the embodiment of the present invention, the AP may transmit a bandwidth query report poll (BQRP) to help efficient resource allocation for MU PPDU transmission, and STAs may transmit a bandwidth query report (BQR) in response thereto. The BQR may include an available channel bitmap field representing available channel information of the corresponding STA. According to an embodiment, the BQR may be carried via the control field of the MAC header. The STA may implicitly carry the BQR through the BQR control field of a frame transmitted to the AP, or may explicitly carry the BQR through a frame transmitted in response to the BQRP trigger frame of the AP. According to the embodiment of the present invention, the BQR transmitted in response to a BQRP trigger frame may be referred to as a solicited BQR, and the BQR transmitted regardless of the reception of the BQRP trigger frame may be referred to as an unsolicited BQR.

According to an embodiment, the AP may transmit a BQRP frame using an MU PPDU format capable of non-contiguous channel allocation-based transmission. The AP may determine whether each channel is available to the STA based on the BQR received from each STA. Through the BQRP/BQR transmission sequence, the AP may perform a non-contiguous channel allocation-based DL MU PPDU transmission by checking the available channel information of the STAs. Referring to the embodiment of FIG. 19, among the channels determined to be idle, the AP transmits the BQRP respectively to STA1 through the P40 channel, to STA2 through the S40B channel, to STA3 through the S80A channel, to STA4 through the S80C channel, and to STA 5 through the S80D channel. The BQRP transmitted to STA1, STA2, STA3, STA4 and STA5 can be carried via a non-contiguous MU PPDU. The AP receives BQR from STA1, STA3 and STA5 in response to BQRP. Thus, the AP can identify that the P40 channel is available to STA1, the S80A channel is available to STA3, and the S80D channel is available to STA5, respectively. However, the AP does not receive the BQR in response to BQRP from STA2 and STA4. Thus, the AP can identify that the S40B channel is not available to STA2, and the S80C channel is not available to STA4, respectively. The AP can perform DL MU PPDU transmission based on the collected available channel information of each STA.

Figure 20:
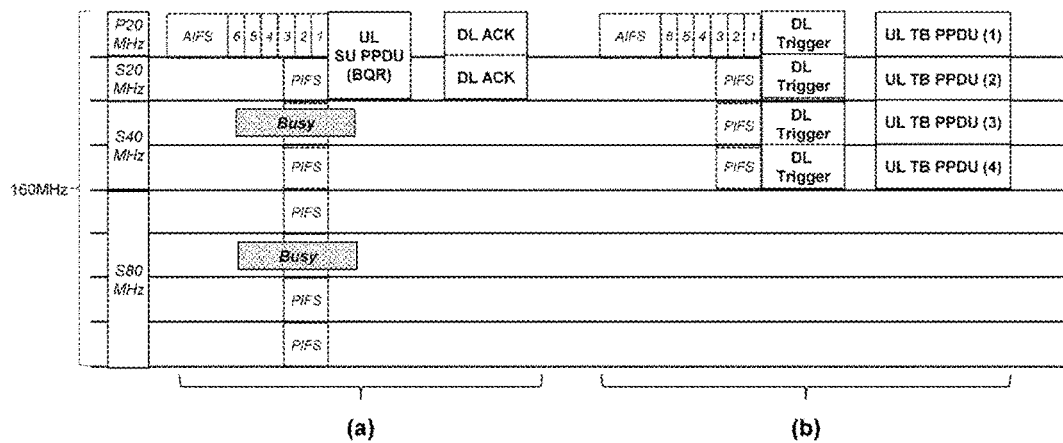
FIG. 20 illustrates another embodiment of a method of transmitting and signaling BQR for transmitting a non-contiguous PPDU.

FIG. 20 illustrates another embodiment of a method of transmitting and signaling BQR for transmitting a non-contiguous PPDU. As described above, the STA may implicitly carry the BQR through the BQR control field of the frame transmitted to the AP. The AP can perform a non-contiguous channel allocation-based DL MU PPDU transmission by checking the available channel information of each STA through the unsolicited BQR received from the STAs at any time.

First, referring to FIG. 20(*a*), the BQR may be transmitted through a UL SU PPDU. The STA that intends to transmit a UL SU PPDU may perform a CCA in the physical layer and transmit the UL SU PPDU using channels determined to be idle based on the CCA result. However, the HE SU PPDU may only be transmitted on a contiguous channel allocation basis. Therefore, when the S40A channel and the S80B channel are busy as in the embodiment of FIG. 20(*a*), the UL SU PPDU may be transmitted through the 40 MHz band including the P20 channel and the S20 channel. In this case, the BQR may be carried via the BQR control field of the frame transmitted through the UL SU PPDU. The BQR may contain available channel information based on the CCA result detected by the corresponding STA.

Next, referring to FIG. 20(*b*), the BQR may be transmitted through an HE trigger-based (TB) PPDU. The STA that intends to transmit an HE-TB PPDU may perform a CCA in the physical layer and transmit the HE TB PPDU using channels determined to be idle based on the CCA result. In this case, the BQR may be carried via the BQR control field of the frame transmitted through the HE TB PPDU. The BQR may contain available channel information based on the CCA result detected by the corresponding STA.

As described above, the AP receiving the UL SU PPDU or the HE TB PPDU containing the BQR may check the available channel information of the corresponding STA and perform a DL PPDU transmission. Meanwhile, the BQR may indicate the available channel information according to various embodiments. A specific embodiment thereof will be described with reference to FIG. 21.

Figure 21:
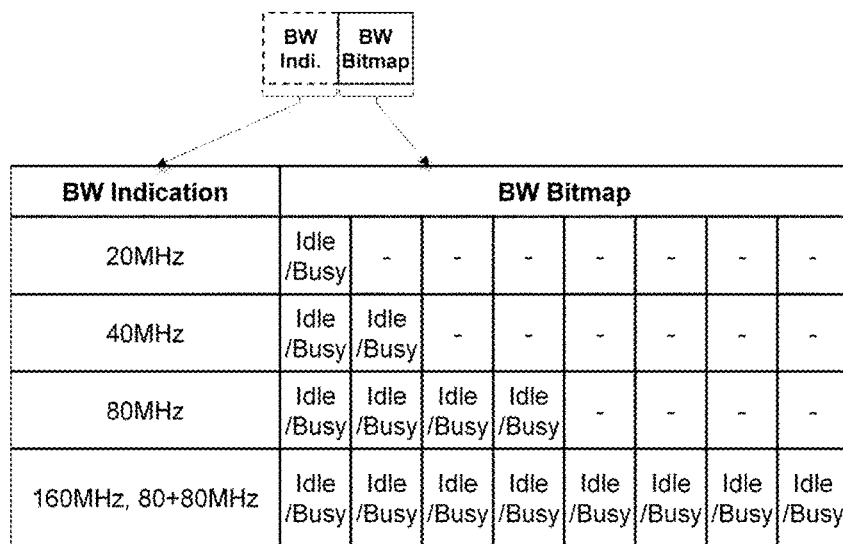
FIG. 21 illustrates a configuration of a BQR according to an embodiment of the present invention.

FIG. 21 illustrates a configuration of a BQR according to an embodiment of the present invention. According to an embodiment of the present invention, the available channel information in the BQR may be represented by an available channel bitmap field. According to an embodiment, the BQR includes a bandwidth indication field and an available channel bitmap field (or a bandwidth bitmap field). However, the bandwidth indication field may be omitted from the BQR according to an embodiment.

The bandwidth indication field may represent the total bandwidth through which the available channel information is carried. According to an embodiment, the bandwidth indication field may consist of 2 bits and may indicate either 20 MHz, 40 MHz, 80 MHz or 160 MHz (including 80+80 MHz). In addition, the available channel bitmap field may consist of 8 bits and may indicate availability (or busy/idle state) of each 20 MHz channel. When the BQR reports available channel information in a total bandwidth of 20 MHz, the bandwidth indication field indicates 20 MHz (or P20 channel). In addition, when the BQR reports available channel information in a total bandwidth of 40 MHz, the bandwidth indication field indicates 40 MHz (or P40 channel). In this case, the first bit and the second bit of the available channel bitmap field indicate availability of each of the two 20 MHz channels in the order of the low frequency to the high frequency within the 40 MHz bandwidth. Next, when the BQR reports available channel information in a total bandwidth of 80 MHz, the bandwidth indication field indicates 80 MHz (or P80 channel). In this case, the first to fourth bits of the available channel bitmap field indicate availability of each of the four 20 MHz channels in the order from the lowest frequency to the highest frequency within the 80 MHz bandwidth. Next, when the BQR reports available channel information in a total bandwidth of 160 MHz (80+80 MHz), the bandwidth indication field indicates 160 MHz (80+80 MHz) (or P160 channel). In this case, the first to eighth bits of the available channel bitmap field indicate availability of each of the eight 20 MHz channels in the order of the lowest frequency to the highest frequency within the 160 MHz (80+80 MHz) bandwidth.

Meanwhile, the BQR may include only the available channel bitmap field without the bandwidth indication field. In this case, the available channel bitmap field may consist of 8 bits, and may indicate availability (or busy/idle state) of each 20 MHz channel. When a 20 MHz channel in which the CCA is not performed according to the CCA performance capability of the STA is present, the value of the bit of the available channel bitmap field corresponding to the channel may be set to 1 (i.e., busy state).

According to the embodiment of the present invention, the BQR may indicate the available channel information in various ways. According to the first embodiment of the present invention, the STA may explicitly signal, through the bandwidth indication field, bandwidth information through which the STA can perform the CCA before transmitting a PPDU including the BQR, and may indicate availability of each channel within the corresponding bandwidth through the available channel bitmap. For example, if the STA performed a CCA only for the corresponding 40 MHz bandwidth before transmitting the 40 MHz PPDU, the bandwidth indication field may indicate 40 MHz and the available channel bitmap field may carry only the CCA results of two 20 MHz channels. However, if the STA performs a CCA for a 160 MHz bandwidth that is wider than the bandwidth of the corresponding PPDU before transmitting the 40 MHz PPDU, the bandwidth indication field may indicate 160 MHz and the available channel bitmap field may carry the CCA result of eight 20 MHz channels. In such an embodiment, the STA may autonomously set the indicated bandwidth of the available channel bitmap field of the BQR based on its CCA performance capability.

Next, according to the second embodiment of the present invention, the STA may perform a CCA for the entire band through which the BQRP trigger frame is received or the entire band through which the PPDU including the BQR is transmitted, and may indicate the availability of each channel within the corresponding bandwidth through the available channel bitmap. In this case, since the bandwidth information for which the available channel information is transmitted is obvious to the transmitter and the receiver, the bandwidth indication field may be omitted from the BQR. If there is a 20 MHz channel in which the CCA is not performed according to the CCA performance capability of the STA among the entire bandwidth in which the PPDU is transmitted, the STA may not perform the transmission of the unsolicited BQR. According to another embodiment, if there is a 20 MHz channel in which the CCA is not performed according to the CCA performance capability of the STA among the entire bands in which the PPDU is transmitted, the value of the bit of the available channel bitmap field corresponding to the channel may be set to 1 (i.e., busy state).

Next, according to the third embodiment of the present invention, the STA may perform a CCA for the total band operated by the BSS to which the corresponding STA is associated, and may indicate the availability of each channel within the corresponding bandwidth through the available channel bitmap. If the bandwidth that the STA can perform the CCA is smaller than the total bandwidth operated by the BSS according to the CCA performance capability of the STA, the availability of each channel within the bandwidth in which the STA can perform the CCA may be indicated through the available channel bitmap. That is, the STA may indicate the availability of each channel through the available channel bitmap based on a smaller value between the total bandwidth operated by the BSS and the bandwidth that the STA can perform the CCA, regardless of the entire band in which the BQRP trigger frame is received or the entire band in which the PPDU including the BQR is transmitted. In this case, since the bandwidth information for which the available channel information is transmitted is obvious to the transmitter and the receiver, the bandwidth indication field may be omitted from the BQR. Therefore, the AP may transmit the DL MU PPDU based on the available channel information of the STA within the entire bandwidth regardless of the transmission bandwidth of the PPDU carrying the BQRP or BQR.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:
1. A wireless communication terminal, the terminal comprising:
a communication unit; and
a processor configured to process signals transmitted and received through the communication unit, wherein the processor is configured to:
receive wireless signal,
identify whether a channel status of a bandwidth for a physical layer protocol data unit, PPDU, is idle or busy based on the received wireless signal,
wherein the channel status of the bandwidth is individually identified for each of a plurality of channels constituting the bandwidth,
wherein the plurality of the channels includes a primary channel and at least one sub-channel,
wherein the channel status of each of the plurality of channels is transmitted from a physical, PHY, layer to a medium access control, MAC, layer through PHY-clear channel assessment (CCA).indication including a bitmap comprising at least one bit indicating the channel status for the at least one sub-channel, and
wherein the PHY-CCA.indication including the bitmap is transmitted from the PHY layer to the MAC layer when the channel state of the primary channel is idle.

2. The wireless communication terminal of claim 1, wherein the processor is further configured to:
perform a clear channel assessment, CCA, procedure for identifying whether the channel status of each of the plurality of channels is the idle or the busy,
wherein the PHY-CCA.indication is used to report the channel status of each of the plurality of channels to the MAC layer through the CCA procedure.

3. The wireless communication terminal of claim 1, wherein a size of the bandwidth is greater than 20 MHz, and
wherein a size of each of the plurality of sub-channels is 20 MHz.

4. The wireless communication terminal of claim 1, wherein the bitmap is composed of 8 bits.

5. The wireless communication terminal of claim 1, wherein the at least one bit corresponding to the at least one sub-channel is set to first value indicating that the channel status of the at least one sub-channel is busy, and
wherein the at least one bit corresponding to the at least one sub-channel is set to second value indicating that the channel status of the at least one sub-channel is idle.

6. A wireless communication method of a wireless communication terminal, the method comprising:
receiving wireless signal;
identify whether a channel status of a bandwidth for a physical layer protocol data unit, PPDU, is idle or busy based on the received wireless signal,
wherein the channel status of the bandwidth is individually identified for each of a plurality of channels constituting the bandwidth,
wherein the plurality of the channels includes a primary channel and at least one sub-channel,
wherein the channel status of each of the plurality of channels is transmitted from a physical, PHY, layer to a medium access control, MAC, layer through PHY-clear channel assessment (CCA).indication including a bitmap comprising at least one bit indicating the channel status for the at least one sub-channel, and
wherein the PHY-CCA.indication including the bitmap is transmitted from the PHY layer to the MAC layer when the channel state of the primary channel is idle.

7. The wireless communication method of claim 6, the method further comprising:
performing a clear channel assessment, CCA, procedure for identifying whether the channel status of each of the plurality of channels is the idle or the busy,
wherein the PHY-CCA.indication is used to report the channel status of each of the plurality of channels to the MAC layer through the CCA procedure.

8. The wireless communication method of claim 6, wherein a size of the bandwidth is greater than 20 MHz, and
wherein a size of each of the plurality of sub-channels is 20 MHz.

9. The wireless communication method of claim 6, wherein the bitmap is composed of 8 bits.

10. The wireless communication method of claim 6, wherein the at least one bit corresponding to the at least one sub-channel is set to first value indicating that the channel status of the at least one sub-channel is busy, and
wherein the at least one bit corresponding to the at least one sub-channel is set to second value indicating that the channel status of the at least one sub-channel is idle.

* * * * *